United States Patent
Ikegawa et al.

(10) Patent No.: US 9,489,969 B1
(45) Date of Patent: Nov. 8, 2016

(54) MAGNETIC HEAD INCLUDING A MAIN POLE AND A WRITE SHIELD TO PROVIDE IMPROVED WRITE CHARACTERISTICS WITHOUT COMPROMISING THE FUNCTION OF THE WRITE SHIELD

(71) Applicants: Yukinori Ikegawa, Milpitas, CA (US); Yoshitaka Sasaki, Santa Clara, CA (US); Kazuki Sato, Milpitas, CA (US); Shigeki Tanemura, Milpitas, CA (US); Hironori Araki, Milpitas, CA (US); Seiichiro Tomita, Milpitas, CA (US)

(72) Inventors: Yukinori Ikegawa, Milpitas, CA (US); Yoshitaka Sasaki, Santa Clara, CA (US); Kazuki Sato, Milpitas, CA (US); Shigeki Tanemura, Milpitas, CA (US); Hironori Araki, Milpitas, CA (US); Seiichiro Tomita, Milpitas, CA (US)

(73) Assignee: HEADWAY TECHNOLOGIES, INC., Milpitas, CA (US)

(*) Notice: Subject to any disclaimer, the term of this patent is extended or adjusted under 35 U.S.C. 154(b) by 0 days.

(21) Appl. No.: 14/925,365

(22) Filed: Oct. 28, 2015

(51) Int. Cl.
*G11B 5/31* (2006.01)
*G11B 5/147* (2006.01)
*G11B 5/265* (2006.01)

(52) U.S. Cl.
CPC .............. *G11B 5/315* (2013.01); *G11B 5/147* (2013.01); *G11B 5/2651* (2013.01); *G11B 5/3169* (2013.01)

(58) Field of Classification Search
None
See application file for complete search history.

(56) References Cited

U.S. PATENT DOCUMENTS

| | | | |
|---|---|---|---|
| 8,345,381 B1* | 1/2013 | Sasaki | G11B 5/17 360/123.03 |
| 8,427,781 B1 | 4/2013 | Sasaki et al. | |
| 8,444,866 B1* | 5/2013 | Guan | G11B 5/1278 216/22 |
| 8,472,137 B2 | 6/2013 | Hirata et al. | |
| 8,498,080 B2 | 7/2013 | Sasaki et al. | |
| 8,587,899 B1 | 11/2013 | Sasaki et al. | |
| 8,628,672 B1* | 1/2014 | Si | G11B 5/1278 216/22 |
| 8,767,347 B1 | 7/2014 | Sasaki et al. | |
| 8,797,686 B1* | 8/2014 | Bai | G11B 5/1278 360/119.03 |
| 9,082,422 B2 | 7/2015 | Sasaki et al. | |
| 9,153,253 B2* | 10/2015 | Yamaguchi | G11B 5/1278 |
| 9,251,812 B2 | 2/2016 | Sasaki et al. | |
| 2013/0038966 A1 | 2/2013 | Sasaki et al. | |
| 2013/0283601 A1* | 10/2013 | Sasaki | G11B 5/1278 29/603.07 |

OTHER PUBLICATIONS

Dec. 11, 2014 U.S. Appl. No. 14/567,590.
Mar. 2, 2016 Notice of Allowance issued in U.S. Appl. No. 14/567,590 in name of Sasaki.

* cited by examiner

*Primary Examiner* — Will J Klimowicz
(74) *Attorney, Agent, or Firm* — Oliff PLC

(57) ABSTRACT

A magnetic head includes a main pole, a write shield and a gap section. The write shield includes a leading shield having a top surface opposed to a bottom end of the main pole. The gap section includes a leading gap section for separating the leading shield from the bottom end of the main pole. The leading gap section is formed using a first nonmagnetic layer and a second nonmagnetic layer. The first nonmagnetic layer has a first front end located closest to but at a distance from the medium facing surface. The second nonmagnetic layer has a second front end located in the medium facing surface.

8 Claims, 22 Drawing Sheets

MAGNETIC HEAD INCLUDING A MAIN POLE AND A WRITE SHIELD TO PROVIDE IMPROVED WRITE CHARACTERISTICS WITHOUT COMPROMISING THE FUNCTION OF THE WRITE SHIELD

BACKGROUND OF THE INVENTION

1. Field of the Invention

The present invention relates to a magnetic head for use to write data on a recording medium by means of a perpendicular magnetic recording system, and more specifically, to a magnetic head including a main pole and a write shield.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a main pole. The main pole has an end face located in a medium facing surface facing a recording medium, and produces, from the end face, a write magnetic field in a direction perpendicular to the plane of the recording medium.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium.

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs depending on the position of the magnetic head across the tracks.

Particularly, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing. In the present application, this phenomenon will be called unwanted erasure. The unwanted erasure includes adjacent track erasure (ATE) and wide-area track erasure (WATE). To achieve higher recording densities, it is necessary to prevent the occurrence of unwanted erasure.

A known technique for preventing unwanted erasure induced by a skew is to provide a wrap-around shield and a gap section, as disclosed in U.S. Pat. No. 8,587,899 B1, for example. The wrap-around shield is a write shield having an end face that is located in the medium facing surface and surrounds the end face of the main pole. The gap section separates the wrap-around shield from the main pole.

The wrap-around shield includes a leading shield, first and second side shields, and a trailing shield. The leading shield has an end face located in the medium facing surface at a position on the leading side of the end face of the main pole. The first and second side shields have two end faces located in the medium facing surface at positions on opposite sides of the end face of the main pole in the track width direction. The trailing shield has an end face located in the medium facing surface at a position on the trailing side of the end face of the main pole.

The gap section includes a leading gap section for separating the leading shield from the main pole, first and second side gap sections for separating the first and second side shields from the main pole, and a trailing gap section for separating the trailing shield from the main pole.

The wrap-around shield has the function of capturing a magnetic flux that is produced from the end face of the main pole and spreads in directions other than the direction perpendicular to the plane of the recording medium, and thereby preventing the magnetic flux from reaching the recording medium. A magnetic head provided with the wrap-around shield is able to prevent unwanted erasure and provide further enhanced recording density.

The position of an end of a record bit to be recorded on the recording medium is determined by the position of the trailing-side edge (hereinafter referred to as the top edge) of the end face of the main pole in the medium facing surface. Accordingly, what are important for improving the write characteristics of the write head unit include: high write magnetic field strength at the top edge or in the vicinity thereof; and a large gradient of change in the write magnetic field strength at the top edge or in the vicinity thereof in the distribution of the write magnetic field strength in the direction in which the tracks extend.

A magnetic head provided with a wrap-around shield suffers from the problem that when a large amount of magnetic flux leaks from the main pole to the wrap-around shield, particularly to the leading shield and the first and second side shields, there occurs reductions in the write magnetic field strength and the aforementioned gradient of change at the top edge of the end face of the main pole or in the vicinity of the top edge, and the write characteristics are thereby degraded.

Now, we will discuss a configuration in which the thickness of the leading gap section is constant regardless of distance from the medium facing surface. First, assume that the thickness of the leading gap section is small. In this case, the distance between the end face of the main pole and the end face of the leading shield in the medium facing surface is small. Thus, the write shield can fully perform the function of capturing a magnetic flux that is produced from the end face of the main pole and spreads in directions other than the direction perpendicular to the plane of the recording medium. However, because of the small distance between the main pole and the leading shield, flux leakage from the main pole to the leading shield increases to degrade the write characteristics.

Next, assume that the thickness of the leading gap section is large. In this case, it is possible to reduce flux leakage from the main pole to the leading shield. However, since the distance between the end face of the main pole and the end face of the leading shield in the medium facing surface is large, the write shield cannot perform its function satisfactorily.

U.S. Pat. No. 8,587,899 B1 discloses a magnetic head in which the leading shield includes a base part, and a protruding part protruding from the base part toward the main pole. The protruding part has an inclined surface facing the main pole, and a rear end face opposite to the medium facing surface. The rear end face forms a greater angle with respect to a direction perpendicular to the medium facing surface than does the inclined surface. The distance between the inclined surface and the main pole is constant regardless of distance from the medium facing surface. On the other hand, the distance between the rear end face and the main pole increases with increasing distance from the medium facing surface.

The magnetic head disclosed in U.S. Pat. No. 8,587,899 B1 reduces flux leakage from the main pole to the leading shield at a location apart from the medium facing surface. In this magnetic head, however, the leading shield is small in volume and thus susceptible to flux saturations. This results in the problem that magnetic flux leaks from the the end face of the leading shield located in the medium facing surface to induce unwanted erasure.

Thus, for the magnetic head including the main pole and the write shield, it has conventionally been difficult to improve the write characteristics without compromising the function of the write shield.

OBJECT AND SUMMARY OF THE INVENTION

It is an object of the present invention to provide a magnetic head that achieves improved write characteristics without compromising the function of the write shield.

A magnetic head of the present invention includes: a medium facing surface configured to face a recording medium; a coil; a main pole; a write shield formed of a magnetic material; and a gap section. The coil produces a magnetic field corresponding to data to be written on the recording medium. The main pole passes a magnetic flux corresponding to the magnetic field produced by the coil, and produces a write magnetic field for use to write data on the recording medium. The gap section is provided between the main pole and the write shield, and includes a first nonmagnetic layer and a second nonmagnetic layer each formed of a nonmagnetic material.

The main pole has: an end face located in the medium facing surface; a top surface located at the front-side end of the main pole in the direction of travel of the recording medium; a bottom end opposite to the top surface; and a first side surface and a second side surface located at opposite ends of the main pole in the track width direction. The write shield includes: a leading shield located on the rear side in the direction of travel of the recording medium relative to the main pole; and a trailing shield located on the front side in the direction of travel of the recording medium relative to the main pole. The leading shield has a leading shield end face located in the medium facing surface, and a top surface opposed to the bottom end of the main pole. The leading shield end face is located on the rear side in the direction of travel of the recording medium relative to the end face of the main pole. The trailing shield has a trailing shield end face located in the medium facing surface, and a bottom surface opposed to the top surface of the main pole. The trailing shield end face is located on the front side in the direction of travel of the recording medium relative to the end face of the main pole.

The gap section includes: a leading gap section for separating the leading shield from the bottom end of the main pole; and a trailing gap section for separating the trailing shield from the top surface of the main pole. The leading gap section is formed using the first nonmagnetic layer and the second nonmagnetic layer. The first nonmagnetic layer has a first front end located closest to but at a distance from the medium facing surface. The second nonmagnetic layer has a second front end located in the medium facing surface.

The top surface of the leading shield includes a first portion and a second portion. The first portion has an end located in the medium facing surface. The second portion is located farther from the medium facing surface than is the first portion, and recessed from the first portion. The first nonmagnetic layer is interposed between the second portion and the second nonmagnetic layer. The bottom end of the main pole includes a third portion opposed to the first portion, and a fourth portion opposed to the second portion. The second nonmagnetic layer is interposed between the first portion and the third portion, whereas the first nonmagnetic layer is not interposed therebetween. The first and second nonmagnetic layers are interposed between the second portion and the fourth portion. The second portion and the fourth portion are substantially parallel to each other.

In the magnetic head of the present invention, there may be no difference in level between the third portion and the fourth portion.

In the magnetic head of the present invention, the top surface of the leading shield may have a first end located in the medium facing surface and a second end opposite to the first end. In this case, the top surface of the leading shield may be inclined with respect to the medium facing surface and a direction perpendicular to the medium facing surface such that the second end is located on the rear side in the direction of travel of the recording medium relative to the first end.

In the magnetic head of the present invention, the write shield may further include a first side shield and a second side shield located on opposite sides of the main pole in the track width direction. The first side shield and the second side shield respectively have a first side shield end face and a second side shield end face located in the medium facing surface at positions on opposite sides of the end face of the main pole in the track width direction. In this case, the gap section may further include a first side gap section and a second side gap section for separating the first side shield and the second side shield from the first side surface and the second side surface of the main pole, respectively.

The magnetic head of the present invention may further include a return path section formed of a magnetic material and connecting the write shield to a part of the main pole located away from the medium facing surface.

A method of manufacturing the magnetic head of the present invention includes the steps of: forming the leading shield; forming the leading gap section after the leading shield is formed; forming the main pole after the leading gap section is formed; forming the trailing gap section after the main pole is formed; forming the trailing shield after the trailing gap section is formed; and forming the coil.

The step of forming the leading shield includes the steps of: forming an initial leading shield having a top surface, the top surface including a first region to become the first portion and a second region to be etched later to form the second portion; forming a mask having an undercut and covering the first region of the top surface of the initial leading shield; and etching the second region of the top surface of the initial leading shield by using the mask so that the first region becomes the first portion and the second portion is formed by the etching of the second region to thereby make the initial leading shield into the leading shield.

The step of forming the leading gap section includes the steps of: forming the first nonmagnetic layer on the second portion in the presence of the mask; removing the mask after the first nonmagnetic layer is formed; and forming the second nonmagnetic layer on the first portion and the first nonmagnetic layer.

In the method of manufacturing the magnetic head of the present invention, the mask may include a first layer, and a second layer stacked on the first layer. In this case, the step of forming the mask may include the steps of: forming an initial first layer on the top surface of the initial leading shied; forming an initial second layer on the initial first layer; patterning the initial second layer into the second layer by photolithography; and etching the initial first layer by wet etching after the patterning of the initial second layer so that the initial first layer becomes the first layer and the mask is thereby completed.

In the method of manufacturing the magnetic head of the present invention, the mask may include a first layer, and a second and a third layer stacked in this order on the first layer. In this case, the step of forming the mask may include the steps of: forming an initial first layer on the top surface of the initial leading shield; forming an initial second layer on the initial first layer; forming the third layer on the initial second layer; etching the initial second layer into the second layer by using the third layer as an etching mask; and etching the initial first layer by wet etching after the etching of the initial second layer so that the initial first layer becomes the first layer and the mask is thereby completed.

In the magnetic head of the present invention, the second nonmagnetic layer is interposed between the first portion of the top surface of the leading shield and the third portion of the bottom end of the main pole, whereas the first nonmagnetic layer is not interposed therebetween. On the other hand, the first and second nonmagnetic layers are interposed between the second portion of the top surface of the leading shield and the fourth portion of the bottom end of the main pole. Thus, the magnetic head and its manufacturing method of the present invention make it possible to reduce flux leakage from the main pole to the leading shield by providing a large distance between the second portion and the fourth portion which are apart from the medium facing surface, while allowing the end face of the main pole and the leading shield end face located in the medium facing surface to be at a desired distance from each other. The present invention thus allows the magnetic head to provide improved write characteristics without compromising the function of the write shield.

Further, according to the manufacturing method for the magnetic head of the present invention, it is possible to precisely define the position of the first front end of the first nonmagnetic layer which has an influence on the write characteristics of the magnetic head.

Other objects, features and advantages of the present invention will become fully apparent from the following description.

DETAILED DESCRIPTION OF THE PREFERRED EMBODIMENT

Figure 2:
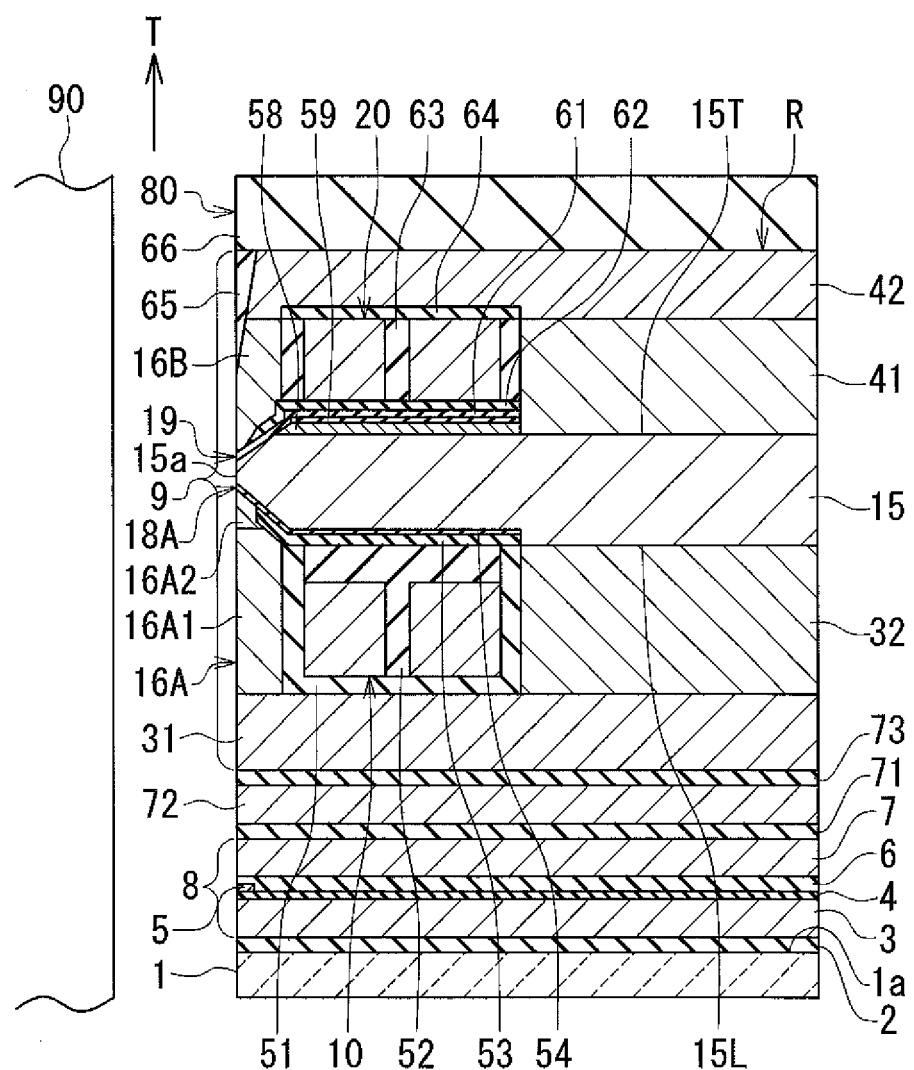
FIG. 2 is a cross-sectional view of the magnetic head according to the embodiment of the invention.
Figure 3:
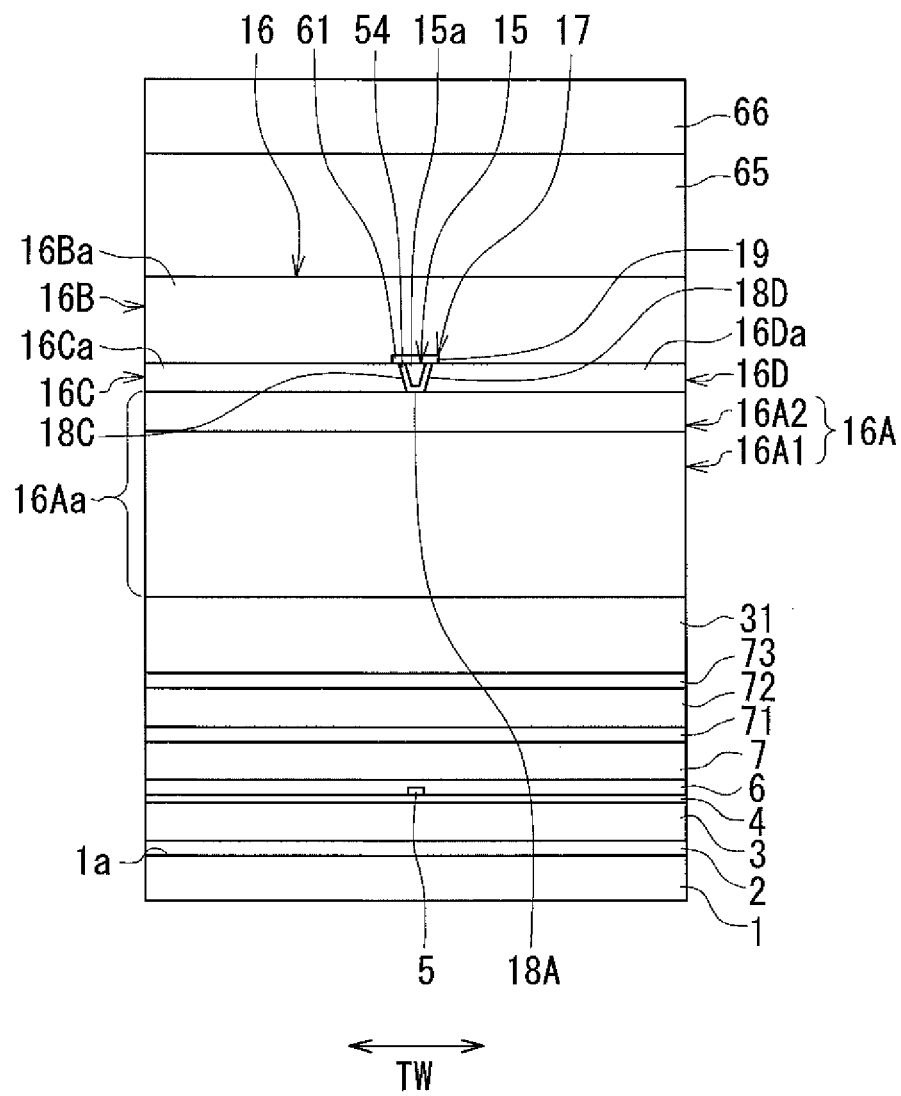
FIG. 3 is a front view showing the medium facing surface of the magnetic head according to the embodiment of the invention.
Figure 4:
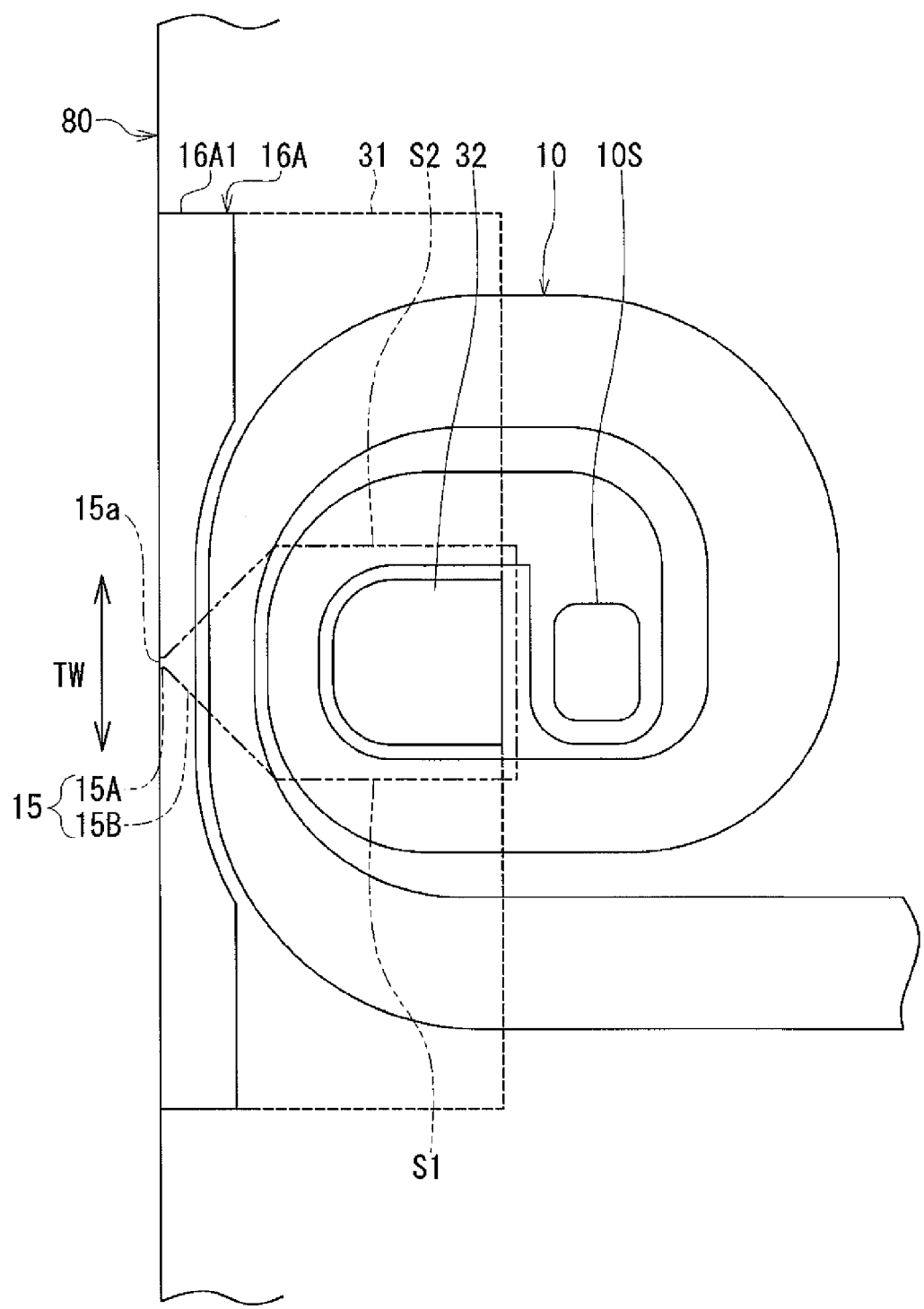
FIG. 4 is a plan view showing a first coil portion of a coil of the magnetic head according to the embodiment of the invention.
Figure 5:
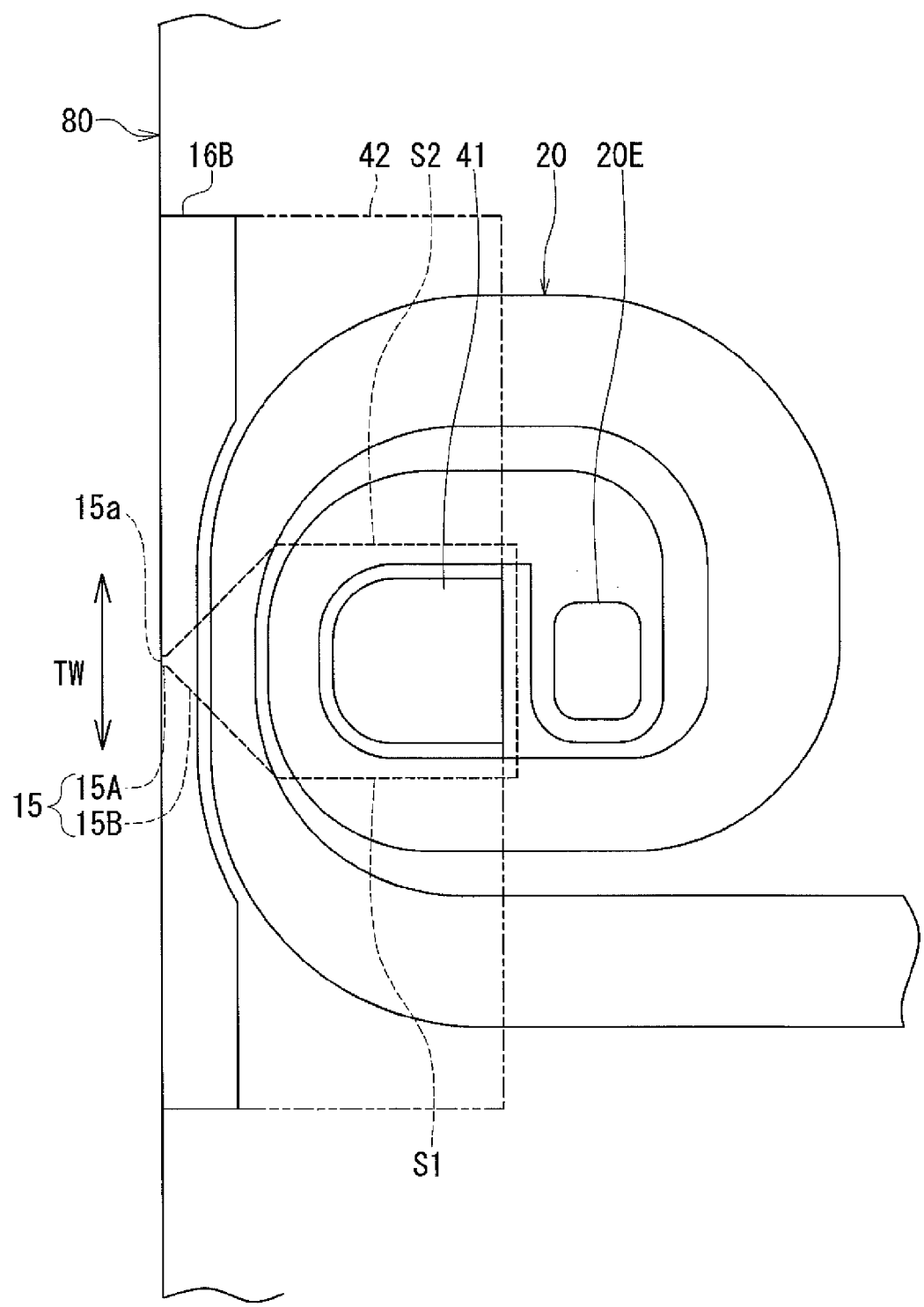
FIG. 5 is a plan view showing a second coil portion of the coil of the magnetic head according to the embodiment of the invention.

A preferred embodiment of the present invention will now be described in detail with reference to the drawings. First, reference is made to FIG. 2 to FIG. 5 to describe the configuration of a magnetic head according to an embodiment of the invention. FIG. 2 is a cross-sectional view of the magnetic head according to the embodiment. The arrow labeled T in FIG. 2 indicates the direction of travel of a recording medium. FIG. 3 is a front view showing the medium facing surface of the magnetic head according to the embodiment. FIG. 4 is a plan view showing a first coil portion of a coil of the magnetic head according to the embodiment. FIG. 5 is a plan view showing a second coil portion of the coil of the magnetic head according to the embodiment. In FIG. 3 to FIG. 5, the arrow labeled TW indicates the track width direction.

The magnetic head according to the embodiment is intended for perpendicular magnetic recording. The magnetic head according to the embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

Here, the side of the positions closer to the leading end relative to a reference position will be referred to as the leading side, and the side of the positions closer to the trailing end relative to the reference position will be referred to as the trailing side. The leading side is the rear side in the direction T of travel of the recording medium 90 relative to the slider. The trailing side is the front side in the direction T of travel of the recording medium 90 relative to the slider.

As shown in FIG. 2, the magnetic head has the medium facing surface 80 mentioned above. As shown in FIG. 2 and FIG. 3, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73.

The middle shield layer 72 has the function of shielding the MR element 5 from magnetic fields generated at the write head unit 9. The nonmagnetic layers 71 and 73 are formed of alumina, for example.

The write head unit 9 includes a coil, a main pole 15, a write shield 16, and a gap section 17 formed of a nonmagnetic material. The coil produces a magnetic field corresponding to data to be written on the recording medium 90. The coil includes a first coil portion 10 and a second coil portion 20. The first coil portion 10 and the second coil portion 20 are both formed of a conductive material such as copper. The first coil portion 10 and the second coil portion 20 are connected in series or in parallel. The main pole 15 has an end face 15a located in the medium facing surface 80. The main pole 15 passes a magnetic flux corresponding to the magnetic field produced by the coil, and produces a write magnetic field for use to write data on the recording medium 90 by means of the perpendicular magnetic recording system. FIG. 2 shows a cross section that intersects the end face 15a of the main pole 15 located in the medium facing surface 80 and that is perpendicular to the medium facing surface 80 and to the top surface 1a of the substrate 1. Such a cross section will hereinafter be referred to as the main cross section.

The write shield 16 includes a leading shield 16A, a trailing shield 16B, a first side shield 16C and a second side shield 16D. The leading shield 16A is located on the leading side, i.e., the rear side in the direction T of travel of the recording medium 90, relative to the main pole 15. The trailing shield 16B is located on the trailing side, i.e., the front side in the direction T of travel of the recording medium 90, relative to the main pole 15. The first and second side shields 16C and 16D are located on opposite sides of the main pole 15 in the track width direction TW and magnetically couple the leading shield 16A and the trailing shield 16B to each other. The shapes of the shields 16A, 16B, 16C and 16D will be described in detail later.

The write shield 16 is formed of a magnetic material. For example, CoFeN, CoNiFe, NiFe, or CoFe can be used to form the write shield 16.

The write head unit 9 further includes a return path section R formed of a magnetic material. The return path section R connects the write shield 16 to a part of the main pole 15 located away from the medium facing surface 80. For example, CoFeN, CoNiFe, NiFe, or CoFe can be used to form the return path section R. The return path section R includes magnetic layers 31, 32, 41 and 42. The magnetic layer 31 lies on the nonmagnetic layer 73. The leading shield 16A and the magnetic layer 32 both lie on the magnetic layer 31. The leading shield 16A is located near the medium facing surface 80. The magnetic layer 32 is located farther from the medium facing surface 80 than is the leading shield 16A. The magnetic layer 31 has an end face located in the medium facing surface 80.

As shown in FIG. 4, the first coil portion 10 is wound around the magnetic layer 32. The write head unit 9 further includes: an insulating layer (not illustrated) formed of an insulating material, lying on the nonmagnetic layer 73 and surrounding the magnetic layer 31; an insulating film 51 formed of an insulating material and separating the first coil portion 10 from the leading shield 16A and the magnetic layers 31 and 32; and an insulating layer 52 formed of an insulating material and covering the first coil portion 10. The top surface of the magnetic layer 32 and the top surface of the insulating layer 52 are located on the front side in the direction T of travel of the recording medium 90 relative to the top surface of the first coil portion 10. The insulating film 51, the insulating layer 52 and the non-illustrated insulating layer are formed of alumina, for example.

The first and second side shields 16C and 16D are disposed on the leading shield 16A. The main pole 15 has: the end face 15a; a top surface 15T (see FIG. 2) located at the front-side end of the main pole 15 in the direction T of travel of the recording medium 90; a bottom end 15L (see FIG. 2) opposite to the top surface 15T; and a first side surface S1 and a second side surface S2 (see FIG. 4 and FIG. 5) located at opposite ends of the main pole 15 in the track width direction TW. The first side shield 16C has a first sidewall opposed to the first side surface S1 of the main pole 15. The second side shield 16D has a second sidewall opposed to the second side surface S2 of the main pole 15.

The gap section 17 is located between the main pole 15 and the write shield 16. The gap section 17 includes: a leading gap section 18A for separating the leading shield 16A from the bottom end 15L of the main pole 15; a first side gap section 18C and a second side gap section 18D for separating the first side shield 16C and the second side shield 16D from the first side surface S1 and the second side surface S2 of the main pole 15, respectively; and a trailing gap section 19 for separating the trailing shield 16B from the top surface 15T of the main pole 15.

The gap section 17 further includes a first nonmagnetic layer 53 and a second nonmagnetic layer 54 each formed of a nonmagnetic material. The leading gap section 18A is formed using the first nonmagnetic layer 53 and the second nonmagnetic layer 54. The first nonmagnetic layer 53 lies on the top surfaces of the insulating film 51 and the insulating layer 52 and a portion of the top surface of the leading shield 16A. The second nonmagnetic layer 54 is disposed to extend along the first and second sidewalls of the first and second side shields 16C and 16D, another portion of the top surface of the leading shield 16A and the top surface of the first nonmagnetic layer 53. The shape and locations of the first and second nonmagnetic layers 53 and 54 will be described in detail later.

For example, the first nonmagnetic layer 53 is formed of a nonmagnetic metal material such as Ru, Cr, Ta or Ti. The nonmagnetic material used to form the second nonmagnetic layer 54 may be an insulating material or a nonmagnetic metal material. Alumina is an example of an insulating material that can be used to form the second nonmagnetic layer 54. Ru is an example of a nonmagnetic metal material that can be used to form the second nonmagnetic layer 54.

A portion of the main pole 15 lies above the top surfaces of the leading shield 16A and the insulating layer 52. The first and second nonmagnetic layers 53 and 54 are interposed between the portion of the main pole 15 and the top surfaces of the leading shield 16A and the insulating layer 52. As shown in FIG. 3, the second nonmagnetic layer 54 also includes a portion interposed between the first side surface S1 of the main pole 15 and the first sidewall of the first side shield 16C, and a portion interposed between the second side surface S2 of the main pole 15 and the second sidewall of the second side shield 16D. The first side gap section 18C is formed by the portion of the second nonmagnetic layer 54 interposed between the first side surface S1 and the first sidewall. The second side gap section 18D is formed by the portion of the second nonmagnetic layer 54 interposed between the second side surface S2 and the second sidewall.

A part of the bottom end 15L of the main pole 15 located away from the medium facing surface 80 is in contact with the top surface of the magnetic layer 32. The main pole 15 is formed of a magnetic metal material. The material of the main pole 15 may be, for example, NiFe, CoNiFe, or CoFe. The shape of the main pole 15 will be described in detail later.

Figure 18A:
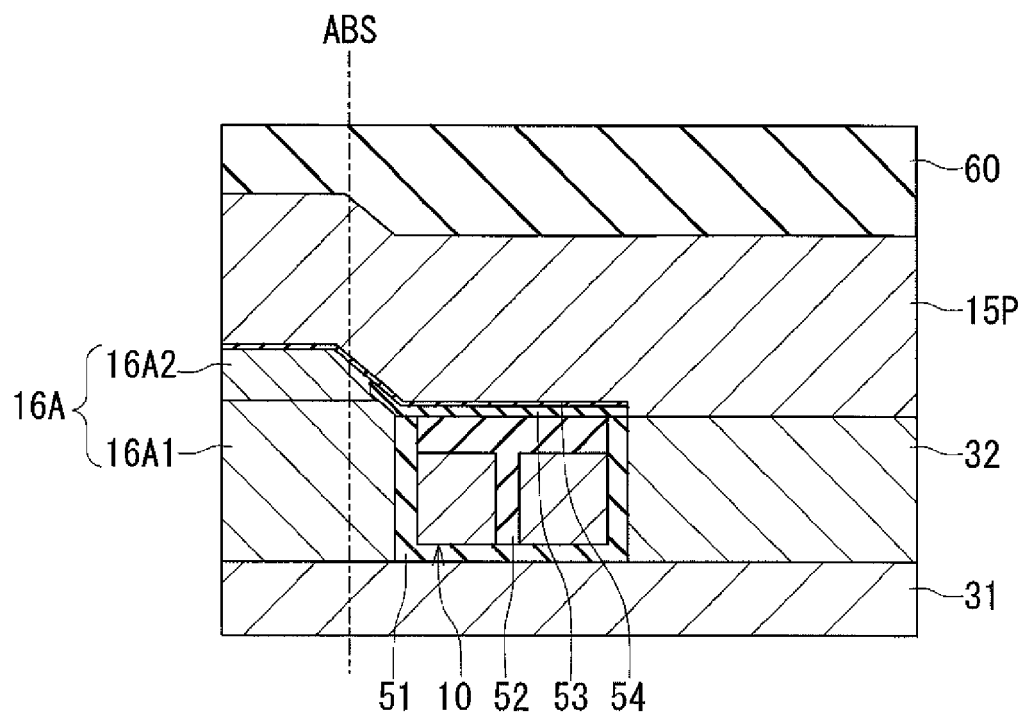
FIG. 18A and FIG. 18B are cross-sectional views showing a step that follows the step shown in FIG. 17A and FIG. 17B.
Figure 18B:
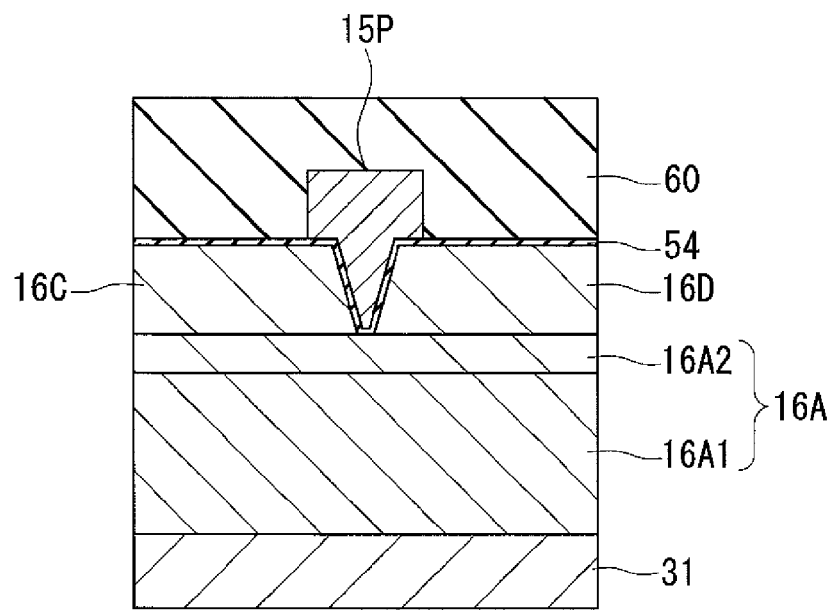

The write head unit 9 further includes a nonmagnetic layer 60 formed of a nonmagnetic material and disposed around the main pole 15, the first side shield 16C and the second side shield 16D. The nonmagnetic layer 60 is shown in FIG. 18A and FIG. 18B, which will be described later. The nonmagnetic layer 60 is formed of alumina, for example.

The write head unit 9 further includes a nonmagnetic metal layer 58 formed of a nonmagnetic metal material, and an insulating layer 59 formed of an insulating material. The nonmagnetic metal layer 58 lies on a first portion of the top surface 15T of the main pole 15, the first portion being apart from the medium facing surface 80. The insulating layer 59 lies on the top surface of the nonmagnetic metal layer 58. The nonmagnetic metal layer 58 is formed of Ru, NiCr, or NiCu, for example. The insulating layer 59 is formed of alumina, for example.

The trailing gap section 19 includes a third nonmagnetic layer 61 and a fourth nonmagnetic layer 62 each formed of a nonmagnetic material. The third nonmagnetic layer 61 is disposed to cover the nonmagnetic metal layer 58, the insulating layer 59 and a portion of the top surface 15T of the main pole 15. The fourth nonmagnetic layer 62 lies on the third nonmagnetic layer 61. The trailing shield 16B lies on the first side shield 16C, the second side shield 16D, the third nonmagnetic layer 61 and the fourth nonmagnetic layer 62. The end face 15a of the main pole 15 has a side adjacent to the third nonmagnetic layer 61, and this side of the end face 15a defines the track width. The shapes and locations of the third and fourth nonmagnetic layers 61 and 62 will be described in detail later.

The third and fourth nonmagnetic layers 61 and 62 may be formed of a nonmagnetic insulating material such as alumina or $SiO_2$, or a nonmagnetic conductive material such as Ru, NiCu, Ta, W, NiB, or NiP. FIG. 2 illustrates an example in which the third and fourth nonmagnetic layers 61 and 62 are formed of an insulating material, in particular.

The magnetic layer 41 lies on a second portion of the top surface 15T of the main pole 15, the second portion being apart from the medium facing surface 80. The second portion of the top surface 15T of the main pole 15 is located farther from the medium facing surface 80 than is the first portion of the top surface 15T of the main pole 15.

As shown in FIG. 5, the second coil portion 20 is wound around the magnetic layer 41. The write head unit 9 further includes insulating layers 63 and 64 each formed of an insulating material. The insulating layer 63 is disposed around the trailing shield 16B, the second coil portion 20 and the magnetic layer 41, and in the space between adjacent turns of the second coil portion 20. The top surfaces of the trailing shield 16B, the second coil portion 20, the magnetic layer 41 and the insulating layer 63 are even with each other. The insulating layer 64 lies on the top surfaces of the second coil portion 20 and the insulating layer 63. The insulating layers 63 and 64 are formed of alumina, for example.

The magnetic layer 42 lies on the trailing shield 16B, the magnetic layer 41 and the insulating layer 64, and connects the trailing shield 16B and the magnetic layer 41. The magnetic layer 42 has an end face that faces toward the medium facing surface 80 and that is located at a distance from the medium facing surface 80. The distance from the medium facing surface 80 to any point on the end face of the magnetic layer 42 increases with increasing distance between the point and the top surface 1a of the substrate 1.

The write head unit 9 further includes a nonmagnetic layer 65 formed of a nonmagnetic material and disposed around the magnetic layer 42. The nonmagnetic layer 65 is formed of alumina, for example.

As shown in FIG. 2 and FIG. 3, the magnetic head further includes a protective layer 66 formed of a nonmagnetic material and disposed to cover the write head unit 9. The protective layer 66 is formed of, for example, an inorganic insulating material such as alumina.

As has been described, the magnetic head according to this embodiment includes the medium facing surface 80, the read head unit 8, and the write head unit 9. The read head unit 8 and the write head unit 9 are stacked on the substrate 1. The write head unit 9 is located on the front side in the direction T of travel of the recording medium 90 relative to the read head unit 8.

The write head unit 9 includes the coil including the first and second coil portions 10 and 20, the main pole 15, the write shield 16, the gap section 17, and the return path section R. The write shield 16 includes the leading shield 16A, the trailing shield 16B, the first side shield 16C and the second side shield 16D. The gap section 17 includes the leading gap section 18A, the first and second side gap sections 18C and 18D, and the trailing gap section 19. The leading gap section 18A is formed using the first nonmagnetic layer 53 and the second nonmagnetic layer 54. The first and second side gap sections 18C and 18D are formed of part of the second nonmagnetic layer 54. The trailing gap section 19 includes the third nonmagnetic layer 61 and the fourth nonmagnetic layer 62. The gap section 17 is formed of nonmagnetic material since the first, second, third and fourth nonmagnetic layers 53, 54, 61 and 62 are formed of nonmagnetic material.

The return path section R includes the magnetic layers 31, 32, 41 and 42. The magnetic layers 31 and 32 are located on the rear side in the direction T of travel of the recording medium 90 relative to the main pole 15. The magnetic layers 31 and 32 connect the write shield 16 (the leading shield 16A) to a part of the main pole 15 located away from the medium facing surface 80 so that a first space is defined by the main pole 15, the write shield 16 and the magnetic layers 31 and 32. The first coil portion 10 passes through the first space.

The magnetic layers 41 and 42 are located on the front side in the direction T of travel of the recording medium 90 relative to the main pole 15. The magnetic layers 41 and 42 connect the write shield 16 (the trailing shield 16B) to a part of the main pole 15 located away from the medium facing surface 80 so that a second space is defined by the main pole 15, the write shield 16 and the magnetic layers 41 and 42. The second coil portion 20 passes through the second space.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 90. The write shield 16 also has the function of capturing a magnetic flux that is produced from the end face 15a of the main pole 15 and spreads in directions other than a direction perpendicular to the plane of the recording medium 90, and thereby preventing the magnetic flux from reaching the recording medium 90. Furthermore, the write shield 16 and the return path section R have the function of allowing a magnetic flux that has been produced from the end face 15a of the main pole 15 and has magnetized a portion of the recording medium 90 to flow back.

The first coil portion 10 and the second coil portion 20 will now be described in detail with reference to FIG. 4 and FIG. 5. As shown in FIG. 4, the first coil portion 10 is wound approximately twice around the magnetic layer 32. The first coil portion 10 includes a portion extending to pass through the first space mentioned above. The first coil portion 10 has a coil connection 10S electrically connected to the second coil portion 20.

As shown in FIG. 5, the second coil portion 20 is wound approximately twice around the magnetic layer 41. The second coil portion 20 includes a portion extending to pass through the second space mentioned above. The second coil portion 20 has a coil connection 20E electrically connected to the coil connection 10S of the first coil portion 10. The coil connection 20E is electrically connected to the coil connection 10S via a connection layer of columnar shape (not illustrated) that penetrates a plurality of layers interposed between the first coil portion 10 and the second coil portion 20. The connection layer lies on the coil connection 10S. The coil connection 20E lies on the connection layer. The connection layer is formed of a conductive material such as copper. In the example shown in FIG. 4 and FIG. 5, the first coil portion 10 and the second coil portion 20 are connected in series.

Figure 1:
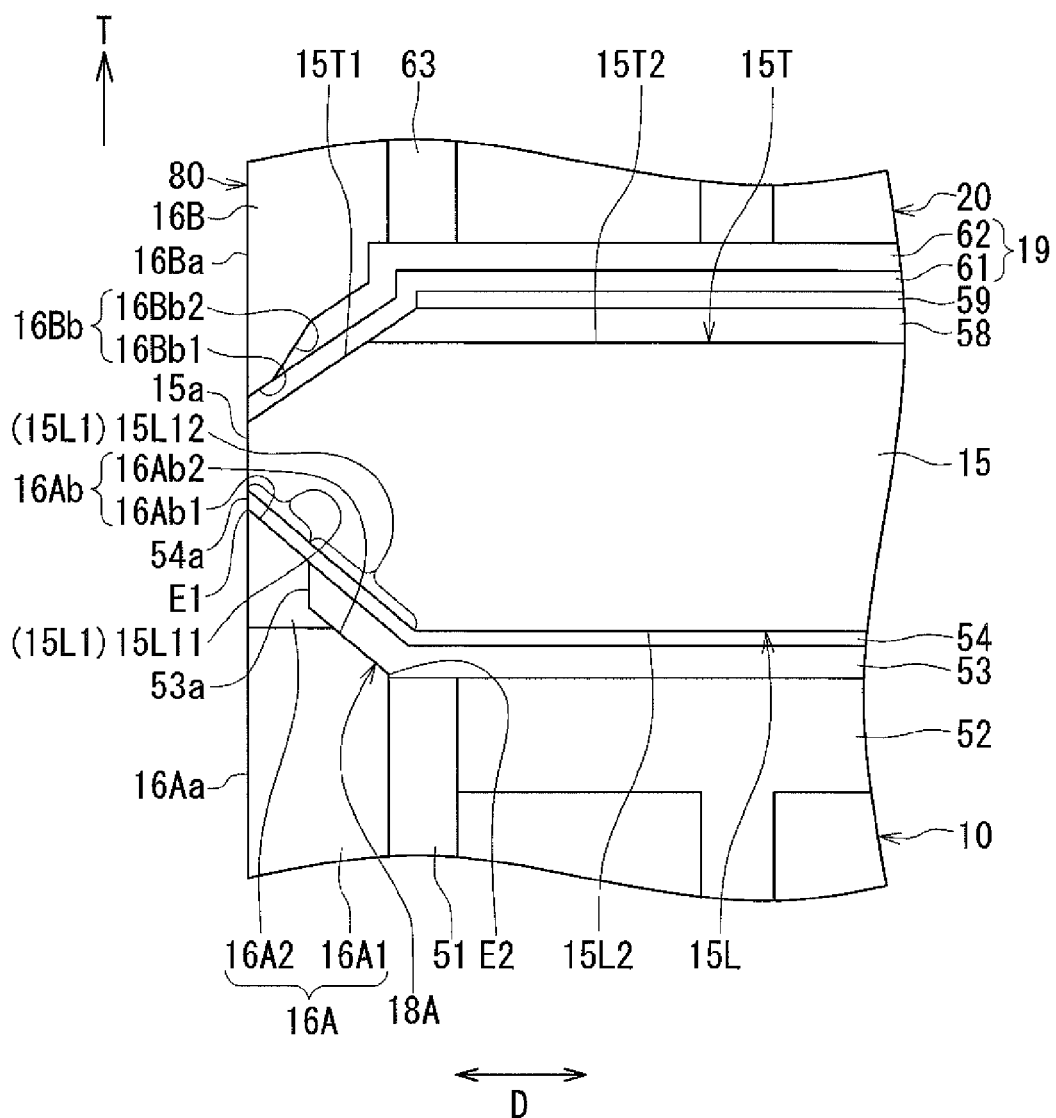
FIG. 1 is a cross-sectional view showing the main part of a magnetic head according to an embodiment of the invention.

The shape of the main pole 15 will now be described in detail with reference to FIG. 1 and FIG. 3 to FIG. 5. FIG. 1 is a cross-sectional view showing the main part of the magnetic head according to this embodiment. FIG. 1 shows the main cross section. As shown in FIG. 4 and FIG. 5, the main pole 15 includes a track width defining portion 15A and a wide portion 15B. The track width defining portion 15A has the end face 15a and an end opposite to the end face 15a. The wide portion 15B is connected to the end of the track width defining portion 15A. As shown in FIG. 1, FIG. 4 and FIG. 5, the main pole 15 has the top surface 15T, the bottom end 15L, the first side surface S1 and the second side surface S2. The width of the top surface 15T in the track width direction TW is greater in the wide portion 15B than in the track width defining portion 15A.

In the track width defining portion 15A, the width of the top surface 15T in the track width direction TW is generally constant regardless of distance from the medium facing surface 80. In the wide portion 15B, the width of the top surface 15T in the track width direction TW is, for example, equal to that in the track width defining portion 15A at the boundary between the track width defining portion 15A and the wide portion 15B, and gradually increases with increasing distance from the medium facing surface 80, then becoming constant. The length of the track width defining portion 15A in the direction perpendicular to the medium facing surface 80 will be referred to as the neck height. The neck height falls within the range of 0 to 0.3 µm, for example. A zero neck height means that the track width defining portion 15A is not present and the wide portion 15B thus has the end face 15a.

As shown in FIG. 1, the top surface 15T includes an inclined portion 15T1 and a flat portion 15T2, the inclined portion 15T1 being located closer to the medium facing surface 80 than the flat portion 15T2. The inclined portion 15T1 has a first end located in the medium facing surface 80 and a second end opposite to the first end. The flat portion 15T2 is connected to the second end of the inclined portion 15T1. The inclined portion 15T1 is inclined with respect to the medium facing surface 80 and the direction perpendicular to the medium facing surface 80 such that the second end is located on the front side in the direction T of travel of the recording medium 90 relative to the first end. In FIG. 1, the arrow labeled D indicates the direction perpendicular to the medium facing surface 80. The flat portion 15T2 extends substantially in the direction D perpendicular to the medium facing surface 80.

As shown in FIG. 1, the bottom end 15L includes an inclined portion 15L1 and a flat portion 15L2, the inclined portion 15L1 being located closer to the medium facing surface 80 than the flat portion 15L2. The inclined portion 15L1 has a first end located in the medium facing surface 80 and a second end opposite to the first end. The inclined portion 15L1 may be an edge formed by two intersecting surfaces, or may be a surface connecting two surfaces. The flat portion 15L2 is a surface connected to the second end of the inclined portion 15L1. The inclined portion 15L1 is inclined with respect to the medium facing surface 80 and the direction D perpendicular to the medium facing surface 80 such that its second end is located on the rear side in the direction T of travel of the recording medium 90 relative to its first end. The flat portion 15L2 extends substantially in the direction D perpendicular to the medium facing surface 80.

As shown in FIG. 3, the end face 15a of the main pole 15 has a first side in contact with the third nonmagnetic layer 61, a second side connected to one end of the first side, and a third side connected to the other end of the first side. The first side defines the track width. The position of an end of a record bit to be recorded on the recording medium 90 is determined by the position of the first side. The width in the track width direction TW of the end face 15a of the main pole 15 decreases with increasing distance from the first side, that is, with decreasing distance to the top surface 1a of the substrate 1. Each of the second side and the third side forms an angle of, for example, 7° to 17°, or preferably 10° to 15°, with respect to a direction perpendicular to the top surface 1a of the substrate 1. The first side has a length in the range of 0.05 to 0.20 µm, for example.

Now, the shapes of the leading shield 16A, the trailing shield 16B, the first side shield 16C and the second side shield 16D will be described in detail with reference to FIG. 1 to FIG. 3. As shown in FIG. 1 and FIG. 3, the leading shield 16A has a leading shield end face 16Aa located in the medium facing surface 80, and a top surface 16Ab opposed to the bottom end 15L of the main pole 15. The leading shield end face 16Aa is located on the leading side, i.e., the rear side in the direction T of travel of the recording medium 90, relative to the end face 15a of the main pole 15. The trailing shield 16B has a trailing shield end face 16Ba located in the medium facing surface 80, and a bottom surface 16Bb opposed to the top surface 15T of the main pole 15. The trailing shield end face 16Ba is located on the trailing side, i.e., the front side in the direction T of travel of the recording medium 90, relative to the end face 15a of the main pole 15. As shown in FIG. 3, the first side shield 16C and the second side shield 16D respectively have a first side shield end face 16Ca and a second side shield end face 16Da located on opposite sides of the end face 15a of the main pole 15 in the track width direction TW. In the medium facing surface 80, the end faces 16Aa, 16Ba, 16Ca and 16Da are arranged to surround the end face 15a of the main pole 15.

As shown in FIG. 1, the top surface 16Ab of the leading shield 16A includes a first portion 16Ab1 and a second portion 16Ab2. The first portion 16Ab1 has an end located in the medium facing surface 80. This end of the first portion 16Ab1 will be referred to as the first end and denoted by symbol E1. The second portion 16Ab2 is located farther from the medium facing surface 80 than is the first portion 16Ab1, and recessed from the first portion 16Ab1. There is a difference in level between the first portion 16Ab1 and the second portion 16Ab2.

The inclined portion 15L1 of the bottom end 15L of the main pole 15 includes a third portion 15L11 opposed to the first portion 16Ab1, and a fourth portion 15L12 opposed to the second portion 16Ab2. Since the inclined portion 15L1 is part of the bottom end 15L, the bottom end 15L can be said to include the third portion 15L11 and the fourth portion 15L12. The second portion 16Ab2 and the fourth portion 15L12 are substantially parallel to each other. As shown in FIG. 1, there is no difference in level between the third portion 15L11 and the fourth portion 15L12.

As shown in FIG. 1, the top surface 16Ab of the leading shield 16A has the first end E1 mentioned above, and a second end E2 opposite to the first end E1. The top surface 16Ab of the leading shield 16A is inclined with respect to the medium facing surface 80 and the direction D perpendicular to the medium facing surface 80 such that the second end E2 is located on the rear side in the direction T of travel of the recording medium 90 relative to the first end E1.

As shown in FIG. 1 to FIG. 3, the leading shield 16A includes a first layer 16A1 lying on the magnetic layer 31, and a second layer 16A2 lying on the first layer 16A1. Each of the first layer 16A1 and the second layer 16A2 has an end face located in the medium facing surface and a top surface. The leading shield end face 16Aa of the leading shield 16A is constituted by the end face of the first layer 16A1 and the end face of the second layer 16A2. The first portion 16Ab1 of the top surface 16Ab of the leading shield 16A is constituted by a part of the top surface of the first layer 16A1. The second portion 16Ab2 of the top surface 16Ab of the leading shield 16A is constituted by another part of the top surface of the first layer 16A1 and a part of the top surface of the second layer 16A2.

As shown in FIG. 1, the bottom surface 16Bb of the trailing shield 16B includes a fifth portion 16Bb1 and a sixth portion 16Bb2. The fifth portion 16Bb1 has an end located in the medium facing surface 80. The sixth portion 16Bb2 is located farther from the medium facing surface 80 than is the fifth portion 16Bb1. The inclined portion 15T1 of the top surface 15T of the main pole 15 includes a seventh portion opposed to the fifth portion 16Bb 1, and an eighth portion opposed to the sixth portion 16Bb2. The bottom surface 16Bb has a first end located in the medium facing surface 80 and a second end opposite to the first end. The bottom surface 16Bb is inclined with respect to the medium facing surface 80 and the direction D perpendicular to the medium facing surface 80 such that the second end is located on the front side in the direction T of travel of the recording medium 90 relative to the first end.

The shapes and locations of the first to fourth nonmagnetic layers 53, 54, 61 and 62 will now be described in detail with reference to FIG. 1. The first nonmagnetic layer 53 has a first front end 53a located closest to but at a distance from the medium facing surface 80. The distance from the medium facing surface 80 to the first front end 53a is smaller than the distance from the medium facing surface 80 to the second end of the inclined portion 15L1 of the bottom end 15L of the main pole 15. The second nonmagnetic layer 54 has a second front end 54a located in the medium facing surface 80.

The first nonmagnetic layer 53 is interposed between the second portion 16Ab2 of the top surface 16Ab of the leading shield 16A and the second nonmagnetic layer 54. More specifically, the first nonmagnetic layer 53 includes a portion interposed between the second portion 16Ab2 and the second nonmagnetic layer 54, which will hereinafter be referred to as the interposition portion. In this embodiment, the thickness of the interposition portion of the first nonmagnetic layer 53 is equal to the difference in level between the first portion 16Ab1 and the second portion 16Ab2 of the top surface 16Ab of the leading shield 16A. Thus, there is no difference in level between the first portion 16Ab1 and the top surface of the interposition portion of the first nonmagnetic layer 53. A portion of the second nonmagnetic layer 54 lying on the first portion 16Ab1 and the interposition portion of the first nonmagnetic layer 53 has a flat top surface.

The second nonmagnetic layer 54 is interposed between the first portion 16Ab1 and the third portion 15L11 of the bottom end 15L of the main pole 15, whereas the first nonmagnetic layer 53 is not interposed therebetween. The first and second nonmagnetic layers 53 and 54 are interposed between the second portion 16Ab2 and the fourth portion 15L12 of the bottom end 15L of the main pole 15. More specifically, the interposition portion of the first nonmagnetic layer 53 and the second nonmagnetic layer 54 are stacked in this order between the second portion 16Ab2 and the fourth portion 15L12. As previously described, there is no difference in level between the third portion 15L11 and the fourth portion 15L12 which are respectively opposed to the first portion 16Ab1 and the top surface of the interposition portion of the first nonmagnetic layer 53.

The third nonmagnetic layer 61 has a third front end located in the medium facing surface 80. The fourth nonmagnetic layer 62 has a fourth front end located closest to but at a distance from the medium facing surface 80. The distance from the medium facing surface 80 to the fourth front end is smaller than the distance from the medium facing surface 80 to the second end of the inclined portion 15T1 of the top surface 15T of the main pole 15. The third nonmagnetic layer 61 is interposed between the fifth portion 16Bb1 of the bottom surface 16Bb of the trailing shield 16B and the seventh portion of the inclined portion 15T1 of the top surface 15T of the main pole 15, whereas the fourth nonmagnetic layer 62 is not interposed therebetween. The third and fourth nonmagnetic layers 61 and 62 are interposed between the sixth portion 16Bb2 of the bottom surface 16Bb of the trailing shield 16B and the eighth portion of the inclined portion 15T1 of the top surface 15T of the main pole 15.

In the medium facing surface 80, the trailing shield end face 16Ba of the trailing shield 16B is at a predetermined distance from the end face 15a of the main pole 15. To allow the trailing shield 16B to perform its function satisfactorily, it is preferred that the distance between the end face 15a of the main pole 15 and the trailing shield end face 16Ba in the medium facing surface 80 be small to some extent. This distance is determined by the thickness of the third nonmagnetic layer 61, and is approximately equal to the thickness of the third nonmagnetic layer 61. The thickness of the third nonmagnetic layer 61 is, for example, in the range of 5 to 60 nm, and preferably in the range of 30 to 60 nm. The thickness of the fourth nonmagnetic layer 62 is, for example, in the range of 30 to 100 nm, and preferably in the range of 50 to 80 nm.

Now, functions and effects specific to the magnetic head according to this embodiment will be described. The magnetic head according to this embodiment allows reduction in unwanted erasure and improvement of recording density by virtue of the function of the write shield 16.

Assume here that the thickness of the leading gap section 18A is constant regardless of distance from the medium facing surface 80. In this case, if the thickness of the leading gap section 18A is small, much magnetic flux leaks from the main pole 15 to the leading shield 16A to degrade the write characteristics. On the other hand, if the thickness of the leading gap section 18A is large, then the end face 15a of the main pole 15 and the leading shield end face 16Aa are at a large distance from each other in the medium facing surface 80, so that the write shield cannot perform its function satisfactorily.

In this embodiment, the leading gap section 18A is formed using the first nonmagnetic layer 53 and the second nonmagnetic layer 54. The second nonmagnetic layer 54 is interposed between the first portion 16Ab1 of the top surface 16Ab of the leading shield 16A and the third portion 15L11 of the bottom end 15L of the main pole 15, whereas the first nonmagnetic layer 53 is not interposed therebetween. On the other hand, the first and second nonmagnetic layers 53 and 54 are interposed between the second portion 16Ab2 of the top surface 16Ab of the leading shield 16A and the fourth portion 15L12 of the bottom end 15L of the main pole 15. Thus, the leading gap section 18A has a small thickness at a location near the medium facing surface 80 and a large thickness at a location apart from the medium facing surface 80.

The distance between the end face 15a of the main pole 15 and the leading shield end face 16Aa in the medium facing surface 80 is determined by the thickness of the second nonmagnetic layer 54. The distance between the second portion 16Ab2 and the fourth portion 15L12 which are apart from the medium facing surface 80 is determined by the total thickness of the first and second nonmagnetic layers 53 and 54. Thus, in this embodiment, the first and second nonmagnetic layers 53 and 54 are used to increase the distance between the second portion 16Ab2 and the fourth portion 15L12, which are apart from the medium facing surface 80, to thereby reduce flux leakage from the main pole 15 to the leading shield 16A, while the second nonmagnetic layer 54 is used to allow the end face 15a of the main pole 15 and the leading shield end face 16Aa to be at a desired distance from each other in the medium facing surface 80. As a result, this embodiment allows the magnetic head to provide improved write characteristics without compromising the function of the write shield 16.

To allow the leading shield 16A to perform its function satisfactorily, it is preferred that the distance between the end face 15a of the main pole 15 and the leading shield end face 16Aa in the medium facing surface 80 be small to some extent. This distance is determined by the thickness of the second nonmagnetic layer 54, and is approximately equal to the thickness of the second nonmagnetic layer 54. The thickness of the second nonmagnetic layer 54 is, for example, in the range of 10 to 100 nm, and preferably in the range of 30 to 60 nm.

For the thickness of the first nonmagnetic layer 53, an optimum value can be selected within a range that can achieve desired function of the write shield 16 and desired write characteristics of the magnetic head. The thickness of the first nonmagnetic layer 53 is, for example, in the range of 10 to 300 nm, and preferably in the range of 30 to 100 nm.

Also, for the distance from the medium facing surface 80 to the first front end 53a, an optimum value can be selected within a range that can achieve desired function of the write shield 16 and desired write characteristics of the magnetic head. The distance from the medium facing surface 80 to the first front end 53a is, for example, in the range of 10 to 300 nm, and preferably in the range of 30 to 100 nm.

Now, assume that the distance between the second portion 16Ab2 and the fourth portion 15L12 increases with increasing distance from the medium facing surface 80 while the fourth portion 15L12 is at a constant angle with respect to the direction D perpendicular to the medium facing surface 80. Such a configuration makes the leading shield 17A small in volume and thus more susceptible to flux saturations. This gives rise to the problem that magnetic flux leaks from the leading shield end face 16Aa to induce unwanted erasure. In contrast, according to this embodiment, the second portion 16Ab2 and the fourth portion 15L12 are substantially parallel to each other. This makes it possible to avoid the occurrence of unwanted erasure resulting from the configuration in which the leading shield 16A has a small volume.

If there is a difference in level between the third portion 15L11 and the fourth portion 15L12, magnetic flux becomes more likely to leak out of the main pole 15 at the boundary between the third portion 15L11 and the fourth portion 15L12. In this embodiment, there is no difference in level between the third portion 15L11 and the fourth portion 15L12. This embodiment thus makes it possible to reduce leakage of magnetic flux out of the main pole 15 when compared with the case where there is a difference in level between the third portion 15L11 and the fourth portion 15L12. This also contributes to improvement in write characteristics of the magnetic head.

In this embodiment, the trailing gap section 19 of the gap section 17 includes the third nonmagnetic layer 61 and the fourth nonmagnetic layer 62. The third nonmagnetic layer 61 is interposed between the fifth portion 16Bb1 of the bottom surface 16Bb of the trailing shield 16B and the seventh portion of the inclined portion 15T1 of the top surface 15T of the main pole 15, whereas the fourth nonmagnetic layer 62 is not interposed therebetween. On the other hand, the third and fourth nonmagnetic layers 61 and 62 are interposed between the sixth portion 16Bb2 of the bottom surface 16Bb of the trailing shield 16B and the eighth portion of the inclined portion 15T1 of the top surface 15T of the main pole 15. The distance between the end face 15a of the main pole 15 and the trailing shield end face 16Ba in the medium facing surface 80 is determined by the thickness of the third nonmagnetic layer 61. The distance between the sixth portion 16Bb2 and the eighth portion which are apart from the medium facing surface 80 is determined by the total thickness of the third and fourth nonmagnetic layers 61 and 62. Thus, in this embodiment, the third and fourth nonmagnetic layers 61 and 62 are used to increase the distance between the sixth portion 16Bb2 and the eighth portion, which are apart from the medium facing surface 80, to thereby reduce flux leakage from the main pole 15 to the trailing shield 16B, while the third nonmagnetic layer 61 is used to allow the end face 15a of the main pole 15 and the trailing shield end face 16Ba to be at a desired distance from each other in the medium facing surface 80. This also makes it possible for this embodiment to improve the write characteristics of the magnetic head without compromising the function of the write shield 16.

A method of manufacturing the magnetic head according to this embodiment will now be described. As shown in FIG. 2 and FIG. 3, the method of manufacturing the magnetic head according to this embodiment starts with forming the insulating layer 2, the first read shield layer 3 and the first read shield gap film 4 in this order into a stack on the substrate 1. Then, the MR element 5 and leads (not illustrated) connected to the MR element 5 are formed on the first read shield gap film 4. The MR element 5 and the leads are then covered with the second read shield gap film 6. Next, the second read shield layer 7, the nonmagnetic layer 71, the middle shield layer 72 and the nonmagnetic layer 73 are formed in this order into a stack on the second read shield gap film 6.

Reference is now made to FIG. 6A to FIG. 21B to describe a series of steps to be performed after the foregoing step up to the formation of the main pole 15. FIG. 6A to FIG. 21B each show a stack formed in the process of manufacturing the magnetic head. FIG. nA (n is an integer between 6 and 21 inclusive) and FIG. 9C each show a cross section perpendicular to the medium facing surface 80 and to the top surface 1a of the substrate 1, particularly the main cross section. FIG. nB and FIG. 9D each show a cross section of the stack taken at the location at which the medium facing surface 80 is to be formed. In FIG. nA and FIG. 9C, the symbol "ABS" indicates the location at which the medium facing surface 80 is to be formed. FIG. nA, FIG. nB, FIG. 9C and FIG. 9D omit the illustration of portions located below the magnetic layer 31.

Figure 6A:
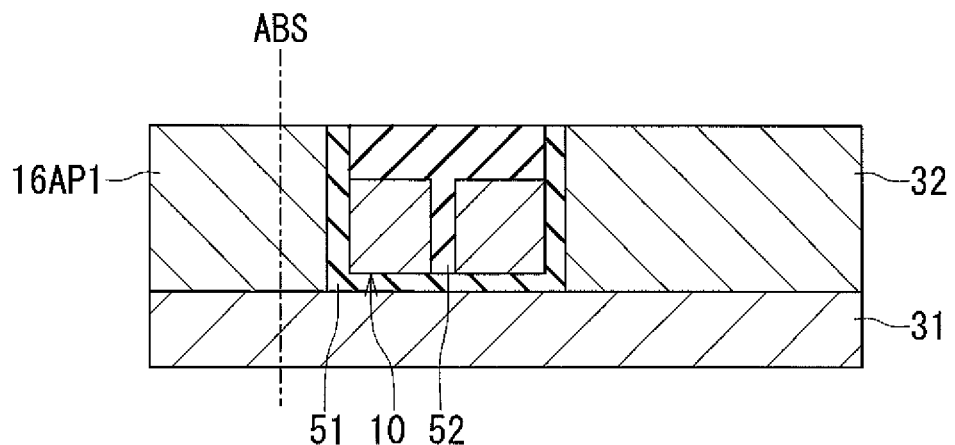
FIG. 6A and FIG. 6B are cross-sectional views showing a step of a method of manufacturing the magnetic head according to the embodiment of the invention.
Figure 6B:
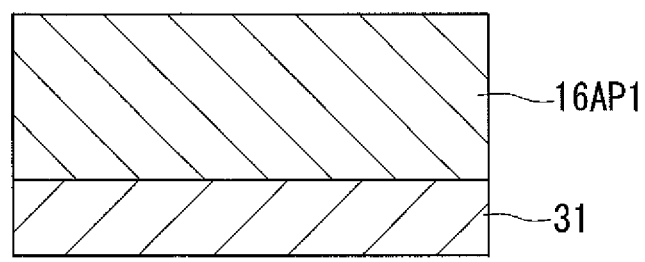

In the step shown in FIG. 6A and FIG. 6B, first, the magnetic layer 31 is formed on the nonmagnetic layer 73 by frame plating, for example. Then, an insulating layer (not illustrated) is formed over the entire top surface of the stack. The non-illustrated insulating layer is then polished by, for example, chemical mechanical polishing (hereinafter referred to as CMP), until the magnetic layer 31 is exposed. Next, an initial first layer 16AP1, which will later become the first layer 16A1 of the leading shield 16A, and the magnetic layer 32 are formed on the magnetic layer 31 by frame plating, for example. The initial first layer 16AP1 and the magnetic layer 32 are formed such that their top surfaces are higher in level than the top surface of the first coil portion 10 to be formed later. Next, the insulating film 51 is formed over the entire top surface of the stack. The first coil portion 10 is then formed by frame plating, for example. Next, the insulating layer 52 is formed over the entire top surface of the stack. The insulating film 51 and the insulating layer 52 are then polished by, for example, CMP, until the initial first layer 16AP1 and the magnetic layer 32 are exposed.

Figure 7A:
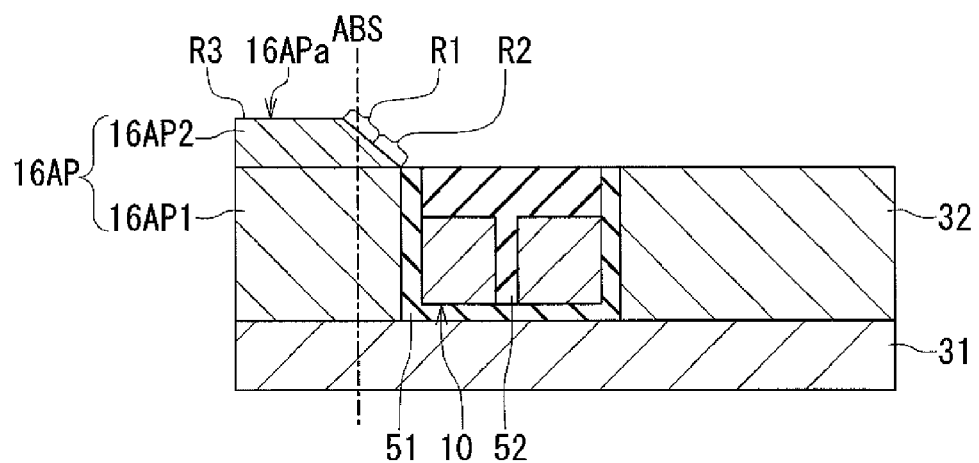
FIG. 7A and FIG. 7B are cross-sectional views showing a step that follows the step shown in FIG. 6A and FIG. 6B.
Figure 7B:
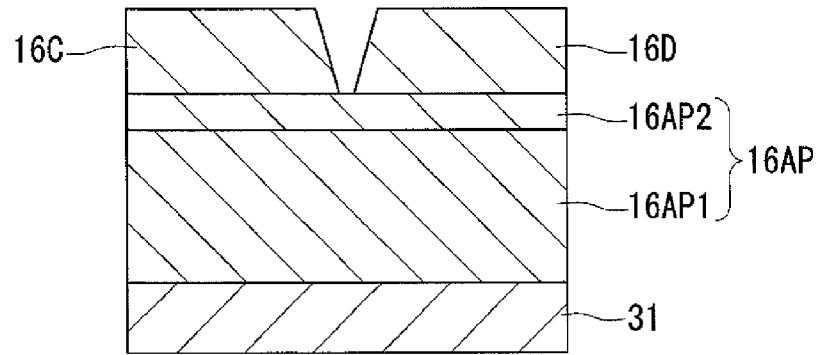

FIG. 7A and FIG. 7B show the next step. In this step, first, an initial second layer 16AP2, which will later become the second layer 16A2 of the leading shield 16A, is formed on the initial first layer 16AP1. The initial first layer 16AP1 and the initial second layer 16AP2 constitute an initial leading shield 16AP which will later become the leading shield 16A. Next, the first and second side shields 16C and 16D are formed on the initial leading shield 16AP.

The initial leading shield 16AP has a top surface 16APa formed by the top surface of the initial second layer 16AP2. The top surface 16APa includes a first region R1 to become the first portion 16Ab1 of the top surface 16Ab of the leading shield 16A, and a second region R2 to be etched later to form the second portion 16Ab2 of the top surface 16Ab of the leading shield 16A. The first region R1 intersects the location ABS at which the medium facing surface 80 is to be formed. The second region R2 is contiguous with the first region R1. The first region R1 and the second region R2 are inclined in the same manner as the first portion 16Ab1 of the top surface 16Ab to be formed later. The top surface 16APa further includes a third region R3 located on a side of the first region R1 opposite from the second region R2 and contiguous with the first region R1. The third region R3 extends substantially parallel to the top surface 1a of the substrate 1.

The initial second layer 16AP2 is formed in the following manner, for example. First, a magnetic layer is formed on the initial first layer 16AP1. A portion of the magnetic layer is then taper-etched by, for example, ion beam etching (hereinafter referred to as IBE), so that the magnetic layer becomes the initial second layer 16AP2. This provides the magnetic layer with the first and second regions R1 and R2. A portion of the top surface of the magnetic layer remaining after the etching makes the third region R3.

In this embodiment, the step shown in FIG. 7A and FIG. 7B is followed by the step of forming a mask 81 having an undercut and covering the first region R1 of the top surface 16APa of the initial leading shield 16AP. The mask 81 may include a first layer, and a second layer stacked on the first layer. Alternatively, the mask 81 may include a first layer, and a second and a third layer stacked in this order on the first layer. The mask 81 in the former case will be referred to as the mask 81 of the first example, and the mask 81 in the latter case will be referred to as the mask 81 of the second example. The following descriptions shall include descriptions of both of the first example and the second example unless otherwise specified.

Figure 8A:
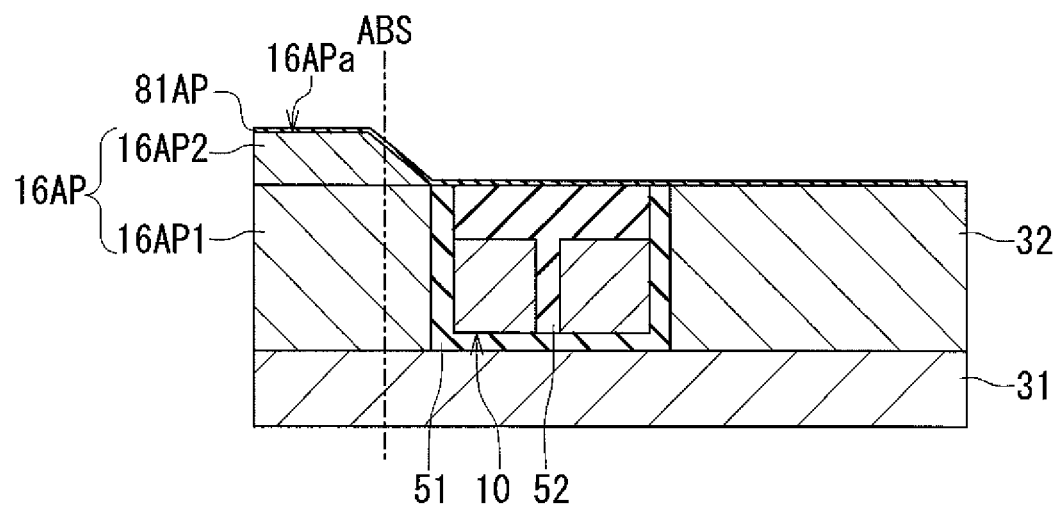
FIG. 8A and FIG. 8B are cross-sectional views showing a step that follows the step shown in FIG. 7A and FIG. 7B.
Figure 8B:
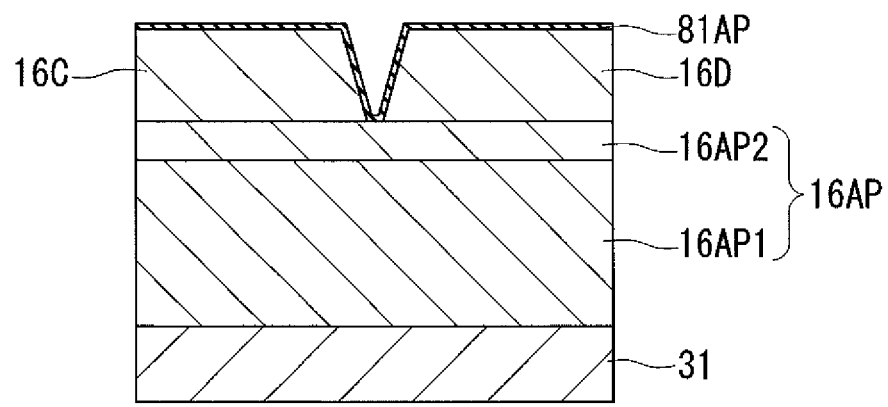

In the step of forming the mask 81, first, as shown in FIG. 8A and FIG. 8B, an initial first layer 81AP to later become the first layer of the mask 81 is formed on the top surface 16APa of the initial leading shield 16AP. The initial first layer 81AP is formed also on the first side shield 16C, the second side shield 16D, the magnetic layer 32, the insulating film 51 and the insulating layer 52. The initial first layer 81AP is formed of a material that can be dissolved by wet etching, such as alumina. Where alumina is employed as the material of the initial first layer 81AP, the initial first layer 81AP is formed by atomic layer deposition, for example. This allows the resulting initial first layer 81AP to be constant in thickness and confirm to the shape of the top surface 16APa of the initial leading shield 16AP.

Figure 9A:
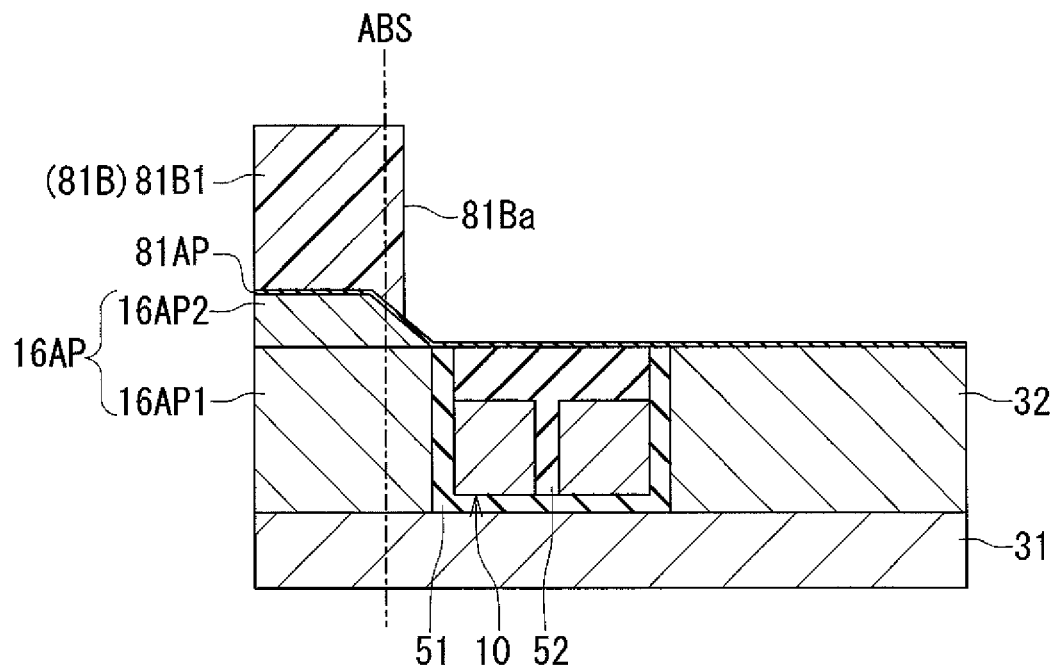
FIG. 9A to FIG. 9D are cross-sectional views showing a step that follows the step shown in FIG. 8A and FIG. 8B.
Figure 9B:
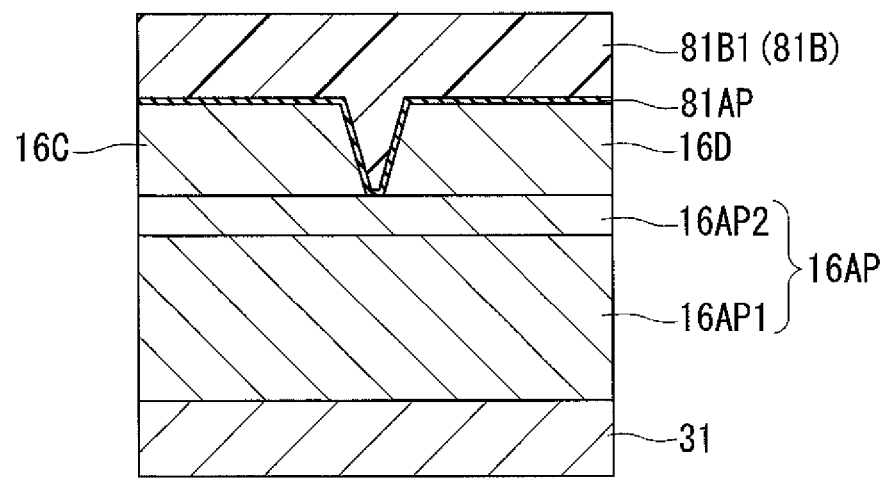
Figure 9C:
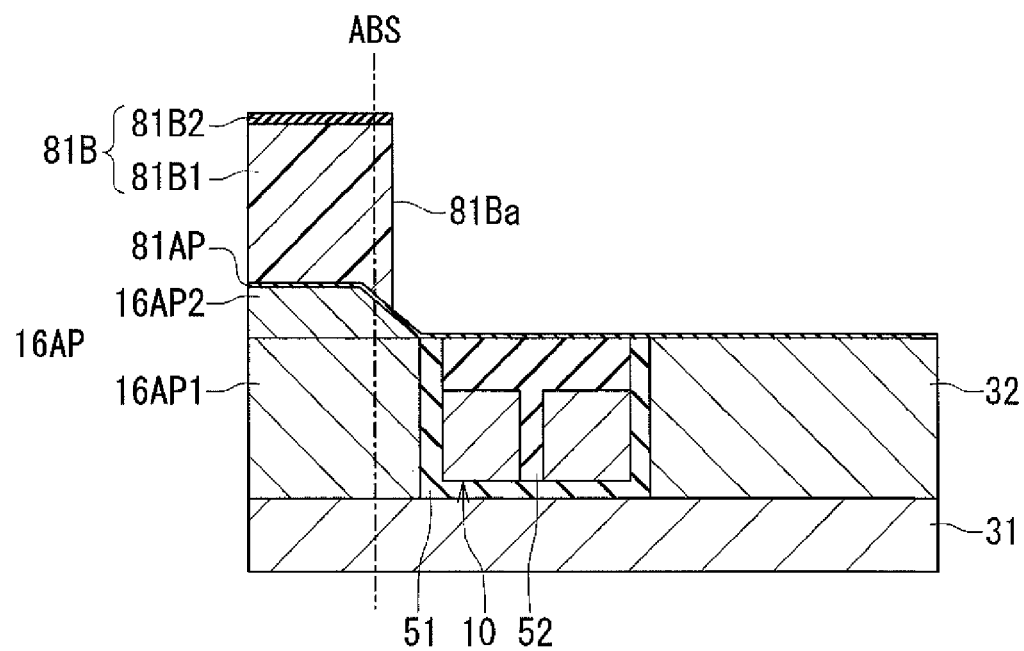
Figure 9D:
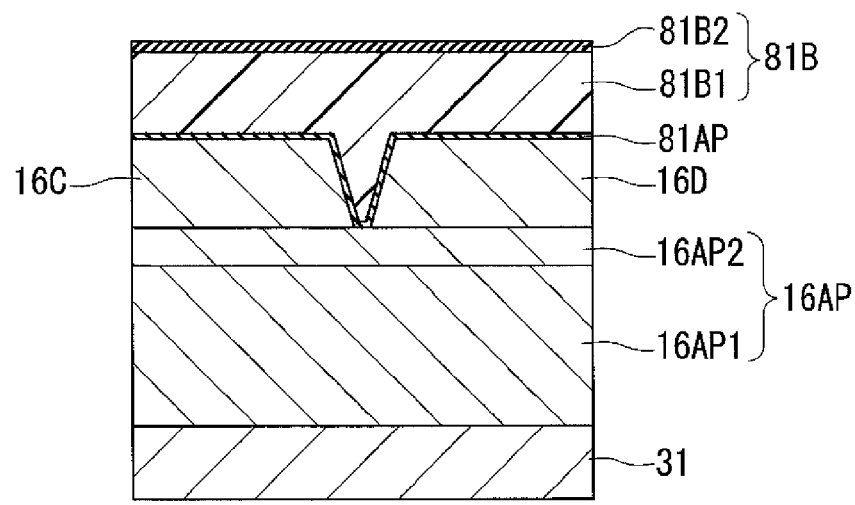

FIG. 9A to FIG. 9D show the next step. FIG. 9A and FIG. 9B show a stack formed in the process of formation of the mask 81 of the first example. FIG. 9C and FIG. 9D show a stack formed in the process of formation of the mask 81 of the second example. In the step of forming the mask 81 of the first example, as shown in FIG. 9A and FIG. 9B, an initial second layer of a photoresist is formed on the initial first layer 81AP after the step of FIG. 8A and FIG. 8B. Then, the initial second layer is patterned into the second layer 81B1 by photolithography.

In the step of forming the mask 81 of the second example, as shown in FIG. 9C and FIG. 9D, an initial second layer is formed on the initial first layer 81AP after the step of FIG. 8A and FIG. 8B. For the second example, the initial second layer is formed of a material harder than that used for the initial second layer of the first example. More specifically, for example, a thermally cured photoresist is used as the material of the initial second layer. Next, the third layer 81B2 is formed on the initial second layer. A hard mask formed of a ceramic material or a metal material is used as the third layer 81B2. FIG. 9C and FIG. 9D show an example in which a ceramic material is selected as the material of the third layer 81B2. The third layer 81B2 is formed in the following manner, for example. First, an initial third layer is formed on the initial second layer. Then, the initial third layer is patterned into the third layer 81B2 by reactive ion etching (hereinafter referred to as RIE) or IBE, for example. For the second example, the initial second layer is then etched using the third layer 81B2 as an etching mask. This makes the initial second layer into the second layer 81B1.

A part of the mask 81 lying on the initial first layer 81AP will be referred to as the upper section and denoted by symbol 81B. For the first example, the upper section 81B is constituted by the second layer 81B1 only. For the second example, the upper section 81B is constituted by the second layer 81B1 and the third layer 81B2. The upper section 81B covers the first and second side shields 16C and 16D and a portion of the initial leading shield 16AP. The upper section 81B has a wall face 81Ba defining the position of the first front end 53a of the first nonmagnetic layer 53 to be formed later.

For the second example, as mentioned previously, the initial second layer is formed of a material harder than that used for the initial second layer of the first example. Accordingly, for the second example, the second layer 81B1 is less likely to get out of shape, and the wall face 81Ba of the upper section 81B can thus be formed more accurately when compared with the first example.

Figure 10A:
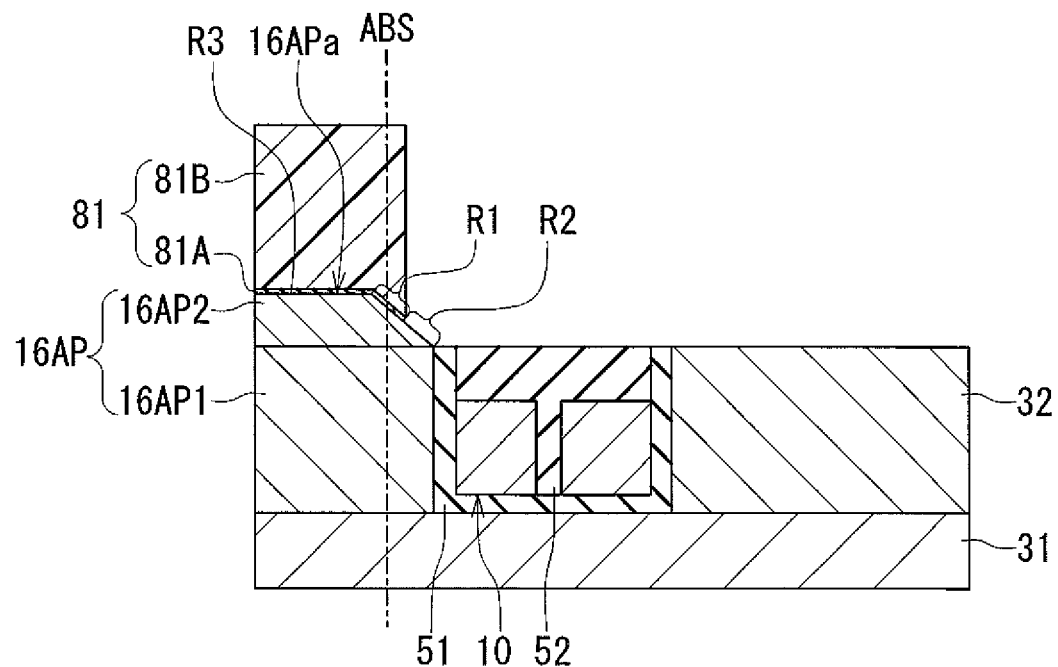
FIG. 10A and FIG. 10B are cross-sectional views showing a step that follows the step shown in FIG. 9A to FIG. 9D.
Figure 10B:
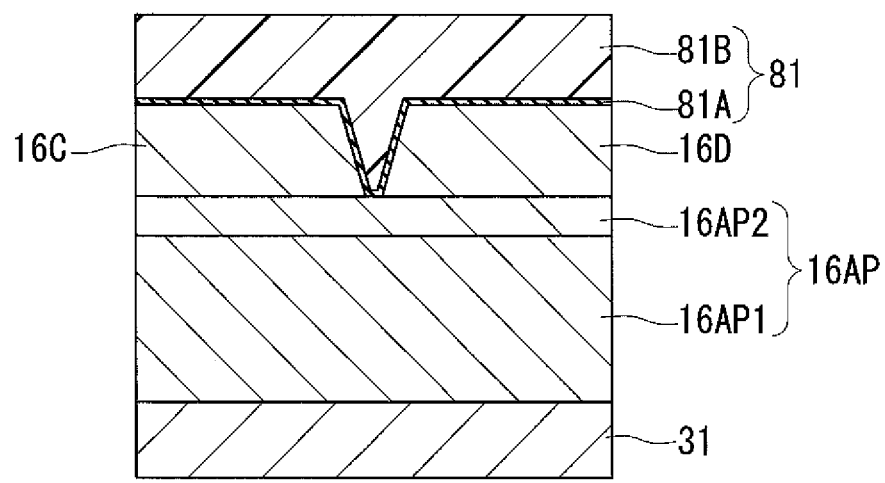

FIG. 10A and FIG. 10B show the next step. In this step, the initial first layer 81AP is etched by wet etching. This makes the initial first layer 81AP into the first layer 81A, thereby completing the mask 81. This etching process etches a portion of the initial first layer 81AP not covered with the upper section 81B and part of a portion of the initial first layer 81AP covered with the upper section 81B and located near the wall face 81Ba. This makes the first layer 81A smaller than the upper section 81B in planar shape (the shape as viewed from above), thereby forming the undercut of the mask 81.

Figure 11A:
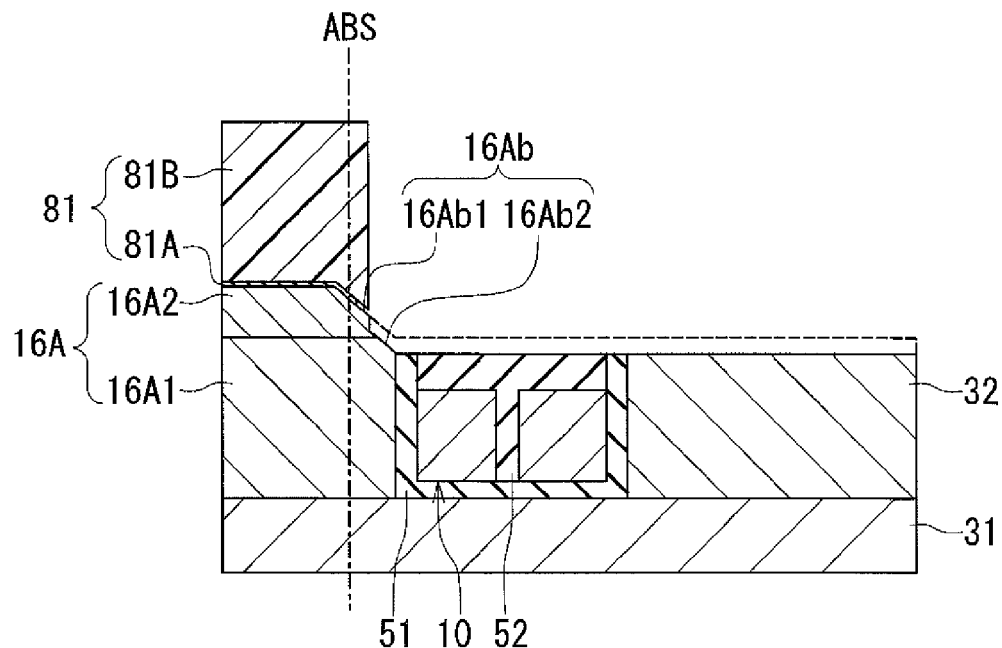
FIG. 11A and FIG. 11B are cross-sectional views showing a step that follows the step shown in FIG. 10A and FIG. 10B.
Figure 11B:
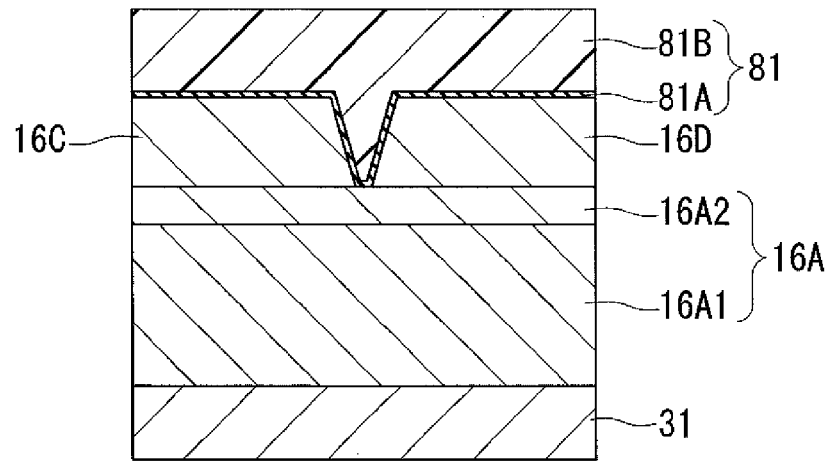

FIG. 11A and FIG. 11B show the step following the formation of the mask 81. In this step, the second region R2 (see FIG. 10A) of the top surface 16APa of the initial leading shield 16AP is etched by, for example, IBE, using the mask 81. The magnetic layer 32, the insulating film 51 and the insulating layer 52 are also etched in part in this etching process. The broken line in FIG. 11A indicates the level of the second region R2 of the top surface 16APa of the initial leading shield 16AP and the top surfaces of the magnetic layer 32, the insulating film 51 and the insulating layer 52 before being etched. As a result of this etching, the first region R1 (see FIG. 10A) becomes the first portion 16Ab1 of the top surface 16Ab. Further, the etching of the second region R2 results in the formation of the second portion 16Ab2 of the top surface 16Ab. The initial leading shield 16AP thereby becomes the leading shield 16A.

Figure 12A:
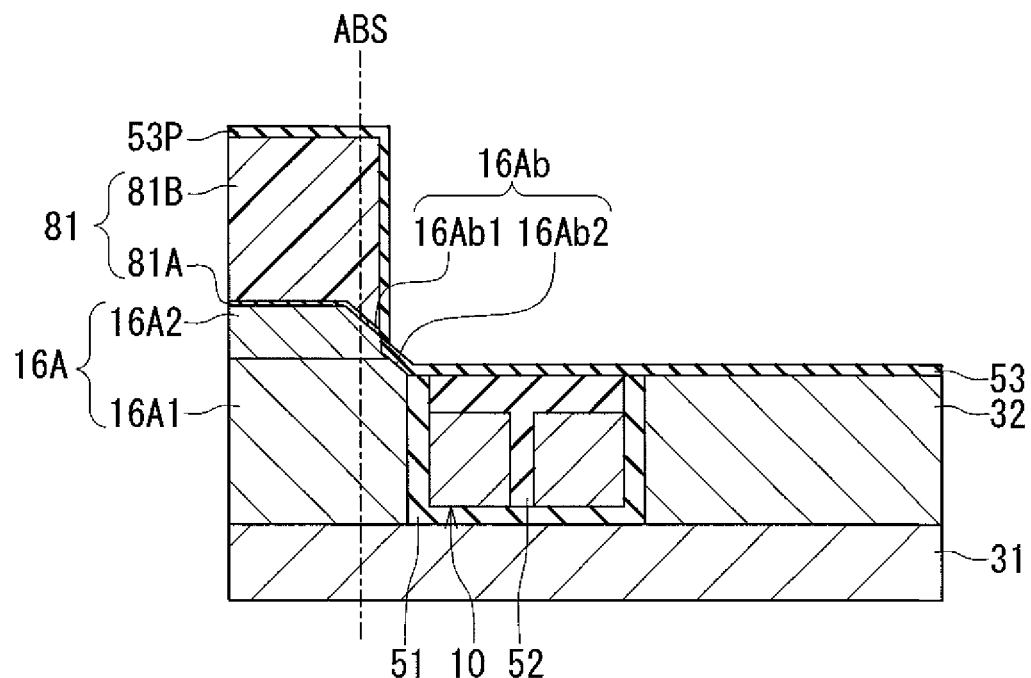
FIG. 12A and FIG. 12B are cross-sectional views showing a step that follows the step shown in FIG. 11A and FIG. 11B.
Figure 12B:
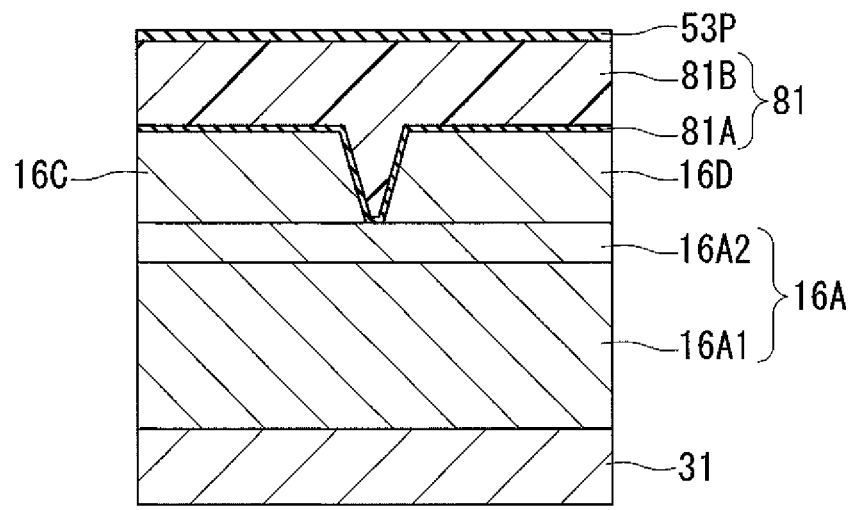
Figure 13A:
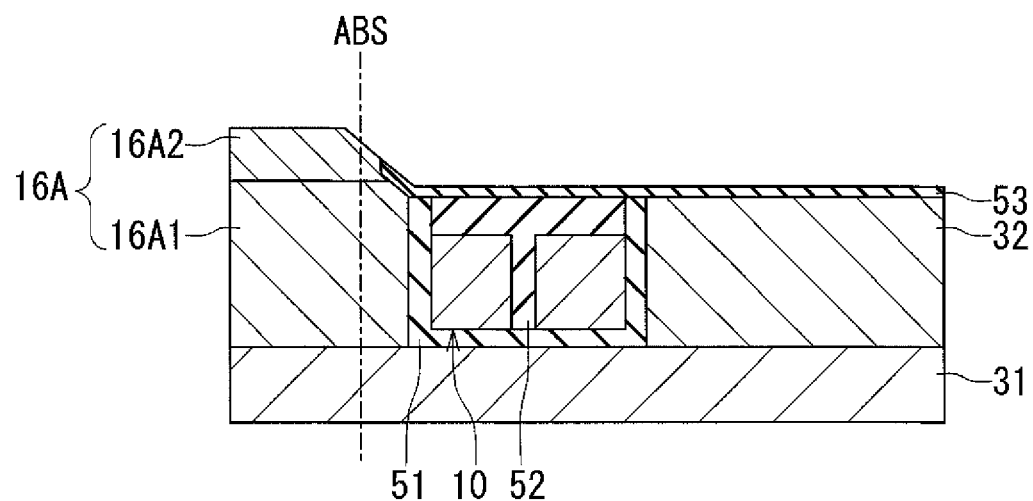
FIG. 13A and FIG. 13B are cross-sectional views showing a step that follows the step shown in FIG. 12A and FIG. 12B.
Figure 13B:
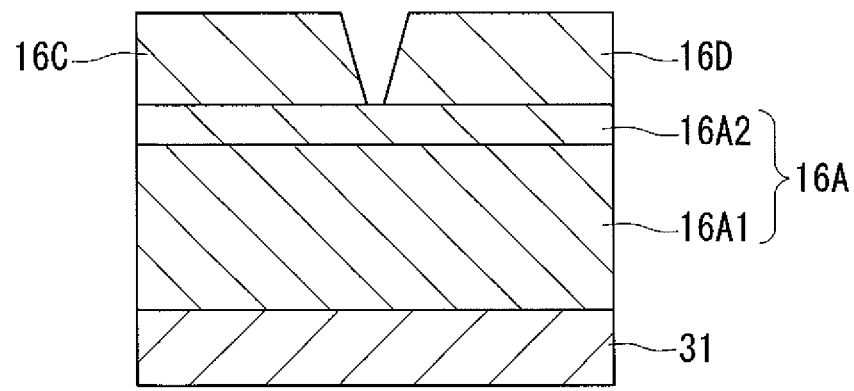

FIG. 12A and FIG. 12B show the next step. In this step, the first nonmagnetic layer 53 is formed by a lift-off process. More specifically, first, in the presence of the mask 81, the first nonmagnetic layer 53 is formed on the second portion 16Ab2 by ion beam deposition, for example. The first nonmagnetic layer 53 is formed also on the magnetic layer 32, the insulating film 51 and the insulating layer 52. The material for forming the first nonmagnetic layer 53 is deposited also onto the surface of the mask 81. In FIG. 12A and FIG. 12B, the reference symbol 53P represents a portion of the material for forming the first nonmagnetic layer 53 deposited on the surface of the mask 81. The mask 81 is then removed (lifted off) as shown in FIG. 13A and FIG. 13B.

Figure 14A:
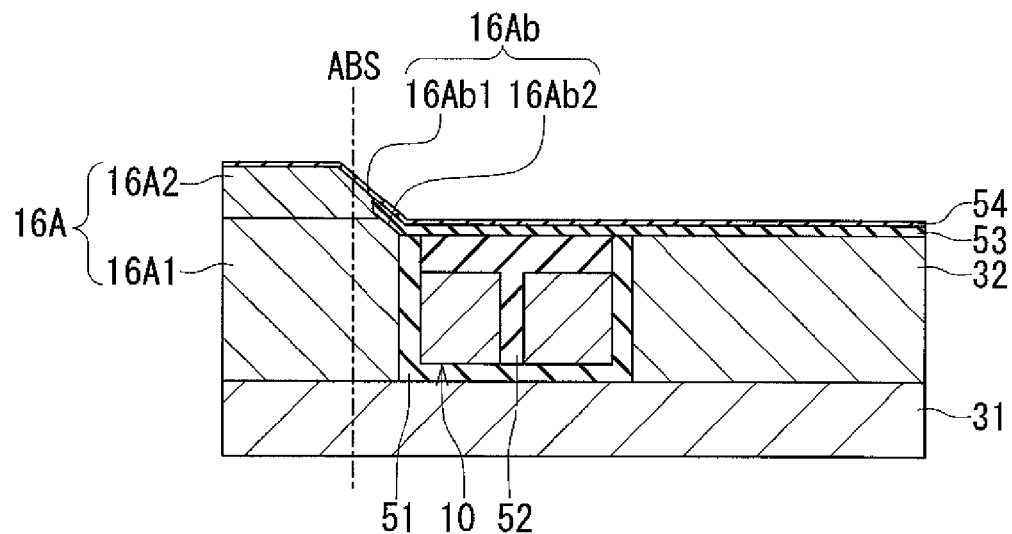
FIG. 14A and FIG. 14B are cross-sectional views showing a step that follows the step shown in FIG. 13A and FIG. 13B.
Figure 14B:
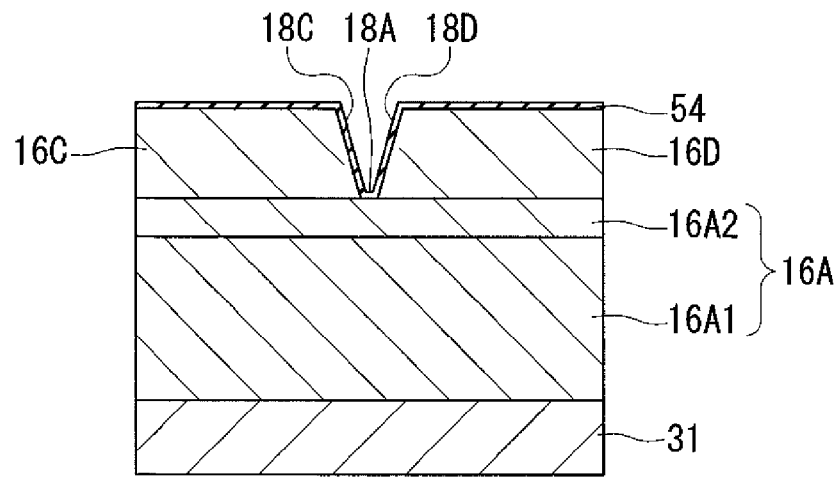

FIG. 14A and FIG. 14B show the next step. In this step, the second nonmagnetic layer 54 is formed on the first portion 16Ab1 and the first nonmagnetic layer 53. The leading gap section 18A is thereby completed. The second nonmagnetic layer 54 is formed also on the first sidewall of the first side shield 16C and the second sidewall of the second side shield 16D. The first and second side gap sections 18C and 18D are thereby completed.

Figure 15A:
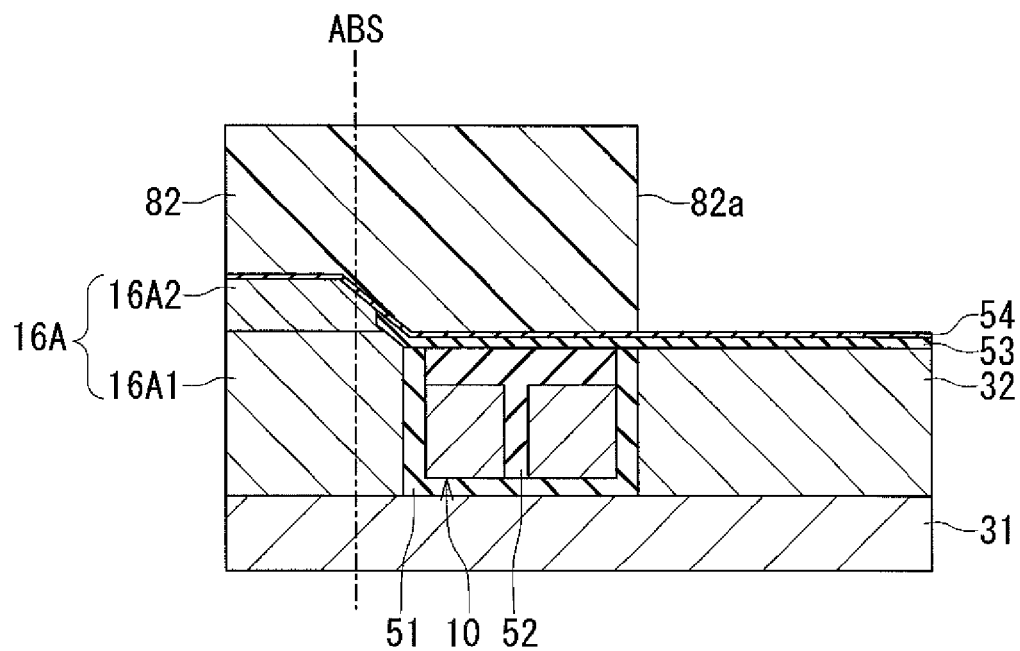
FIG. 15A and FIG. 15B are cross-sectional views showing a step that follows the step shown in FIG. 14A and FIG. 14B.
Figure 15B:
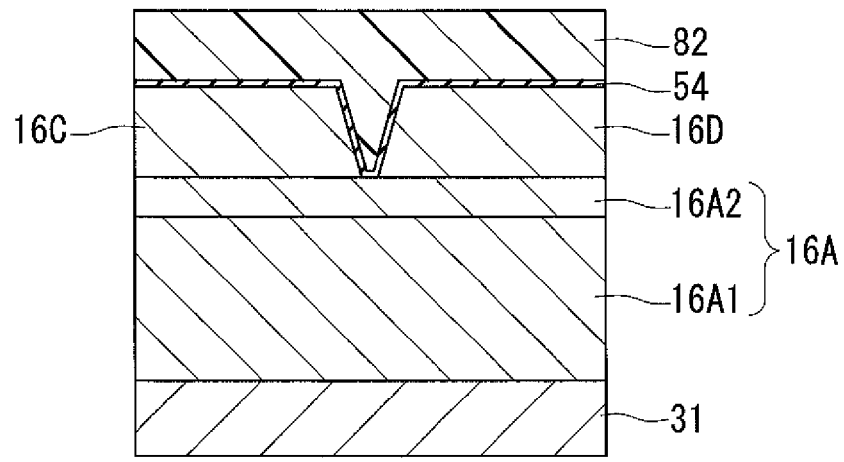

FIG. 15A and FIG. 15B show the next step. In this step, a mask 82 is formed on the stack. For example, the mask 82 is formed by patterning a photoresist layer by photolithography. The mask 82 has a first opening 82a located above the magnetic layer 32 and a second opening (not illustrated) located above the coil connection 10S (see FIG. 4).

Figure 16A:
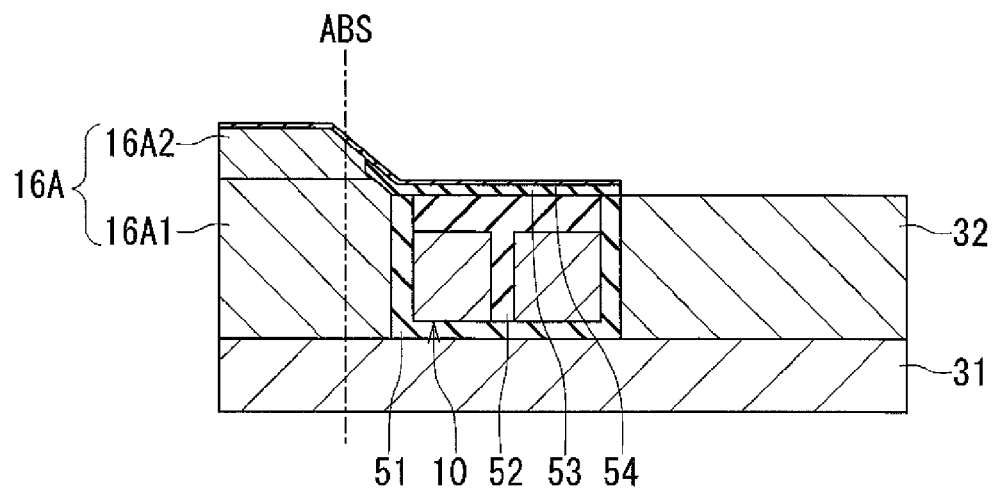
FIG. 16A and FIG. 16B are cross-sectional views showing a step that follows the step shown in FIG. 15A and FIG. 15B.
Figure 16B:
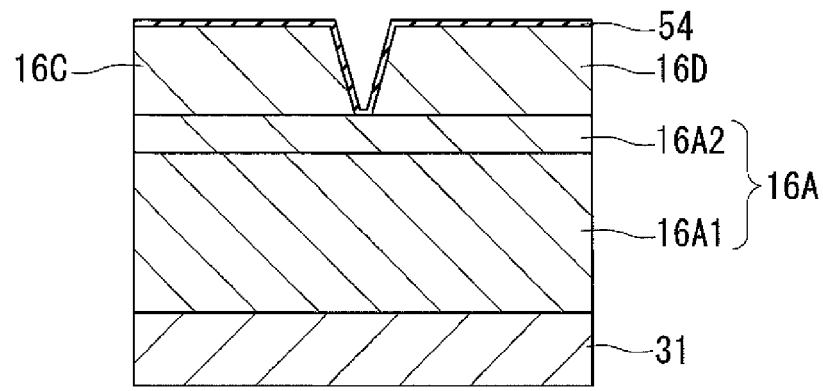

FIG. 16A and FIG. 16B show the next step. In this step, first, portions of the first and second nonmagnetic layers 53 and 54 exposed from the first opening 82a of the mask 82 and portions of the insulating layer 52 and the first and second nonmagnetic layers 53 and 54 exposed form the second opening of the mask 82 are removed by, for example, RIE or IBE using the mask 82. The mask 82 is then removed.

Figure 17A:
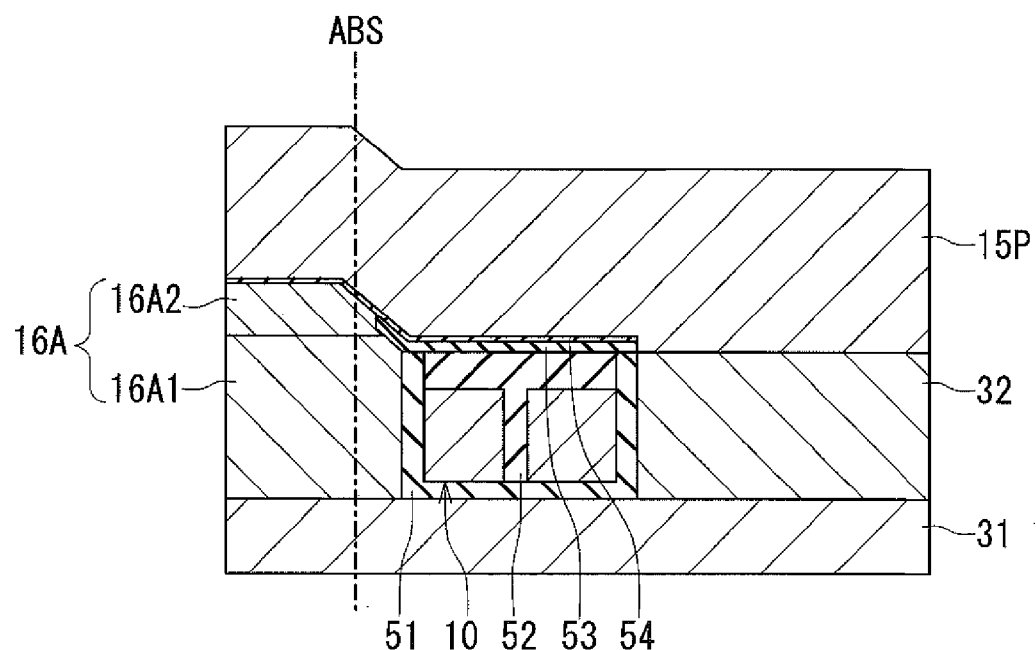
FIG. 17A and FIG. 17B are cross-sectional views showing a step that follows the step shown in FIG. 16A and FIG. 16B.
Figure 17B:
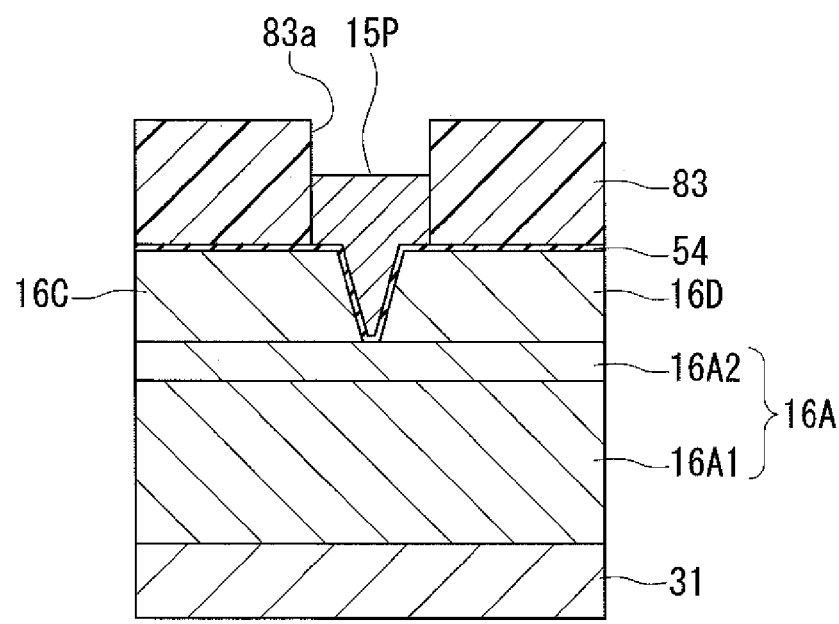

FIG. 17A and FIG. 17B show the next step. In this step, first, a seed layer (not illustrated) is formed on the magnetic layer 32 and the second nonmagnetic layer 54. Then, a mask 83 is formed on the stack. For example, the mask 83 is formed by patterning a photoresist layer by photolithography. The mask 83 has an opening 83a shaped to correspond to the planar shape of the main pole 15. Then, an initial main pole 15P, which will later become the main pole 15, is formed in the opening 83a of the mask 83 by plating, using the seed layer as an electrode and a seed. The mask 83 is then removed. Further, the connection layer (not illustrated) is formed on the coil connection 10S (see FIG. 4). The initial main pole 15 and the non-illustrated connection layer are formed such that their top surfaces are higher in level than portions of the second nonmagnetic layer 54 lying on the first and second side shields 16C and 16D.

Figure 19A:
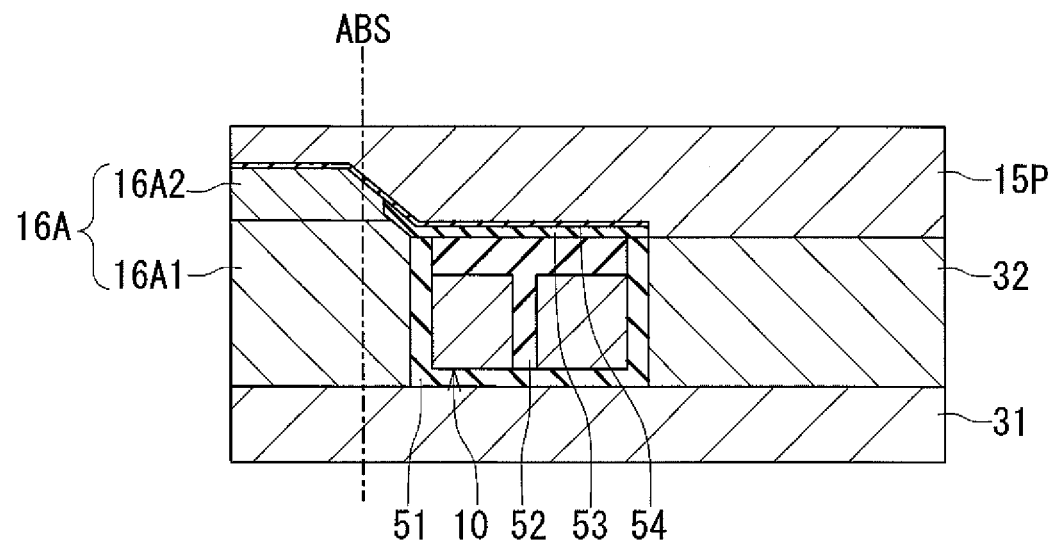
FIG. 19A and FIG. 19B are cross-sectional views showing a step that follows the step shown in FIG. 18A and FIG. 18B.
Figure 19B:
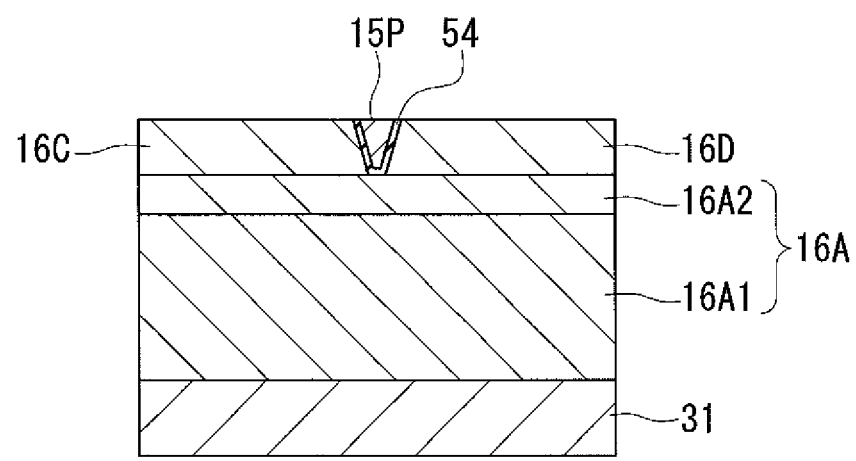

FIG. 18A and FIG. 18B show the next step. In this step, the nonmagnetic layer 60 is formed over the entire top surface of the stack. Next, as shown in FIG. 19A and FIG. 19B, the initial main pole 15P, the second nonmagnetic layer 54, the nonmagnetic layer 60 and the non-illustrated connection layer are polished by, for example, CMP, until the first and second side shields 16C and 16D are exposed.

Figure 20A:
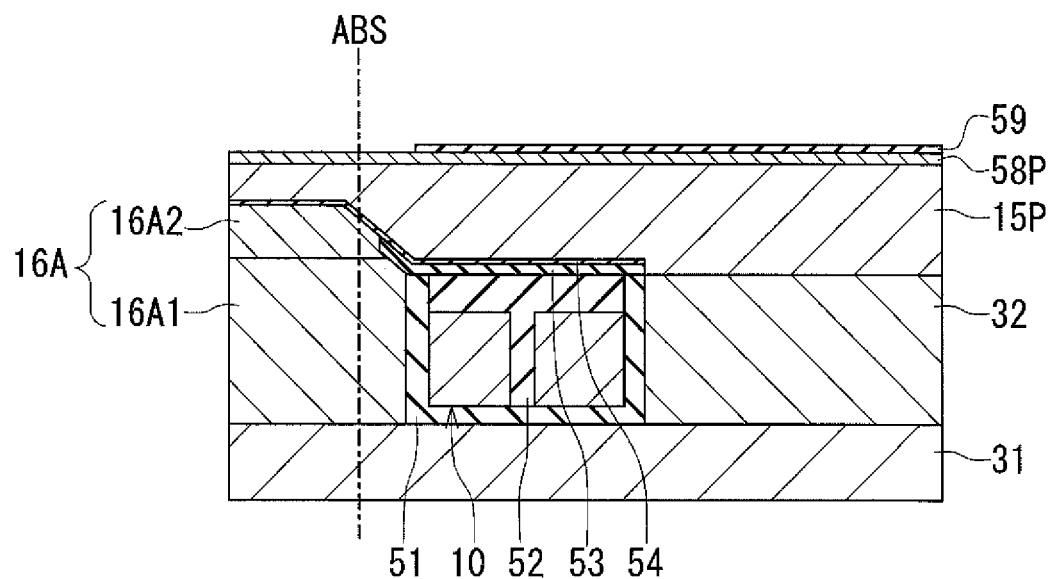
FIG. 20A and FIG. 20B are cross-sectional views showing a step that follows the step shown in FIG. 19A and FIG. 19B.
Figure 20B:
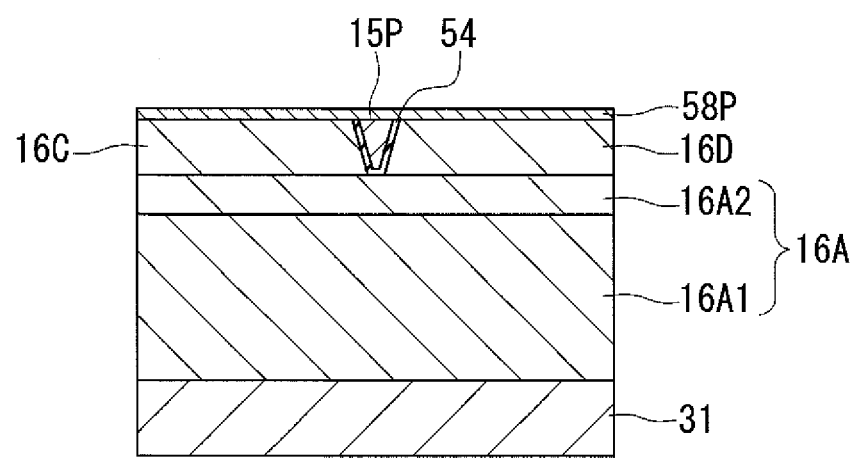

FIG. 20A and FIG. 20B show the next step. In this step, first, an initial nonmagnetic metal layer 58P, which will later become the nonmagnetic metal layer 58, is formed on the initial main pole 15P, the first side shield 16C and the second side shield 16D. An initial insulating layer to later become the insulating layer 59 is then formed on the initial nonmagnetic metal layer 58P. A photoresist mask (not illustrated) is then formed on the initial insulating layer. Next, a portion of the initial insulating layer is etched by, for example, RIE, using the photoresist mask as an etching mask. This makes the initial insulating layer into the insulating layer 59. The initial nonmagnetic metal layer 58P functions as an etching stopper to stop the etching when the initial insulating layer is etched by RIE. The non-illustrated photoresist mask is then removed.

Figure 21A:
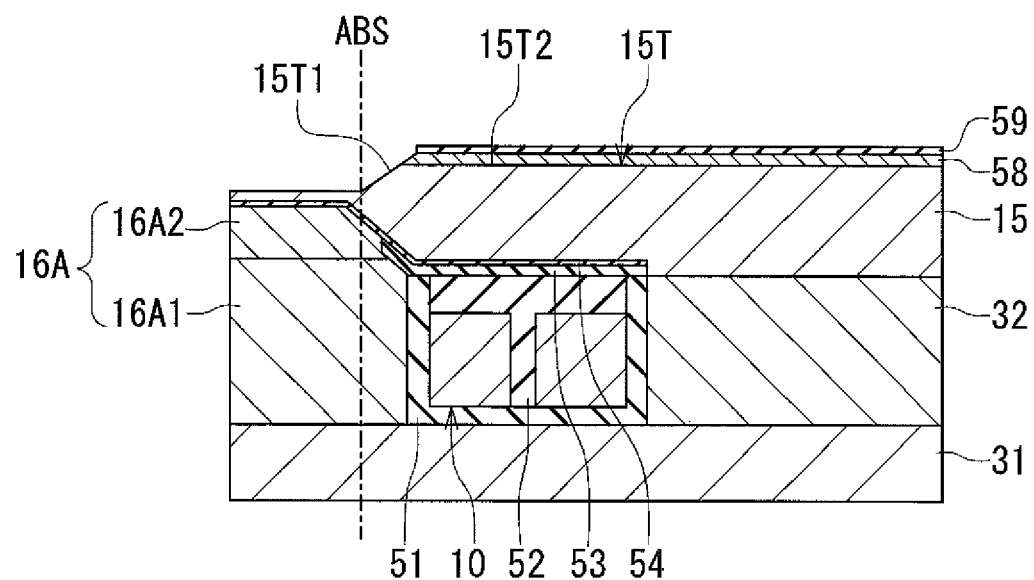
FIG. 21A and FIG. 21B are cross-sectional views showing a step that follows the step shown in FIG. 20A and FIG. 20B.
Figure 21B:
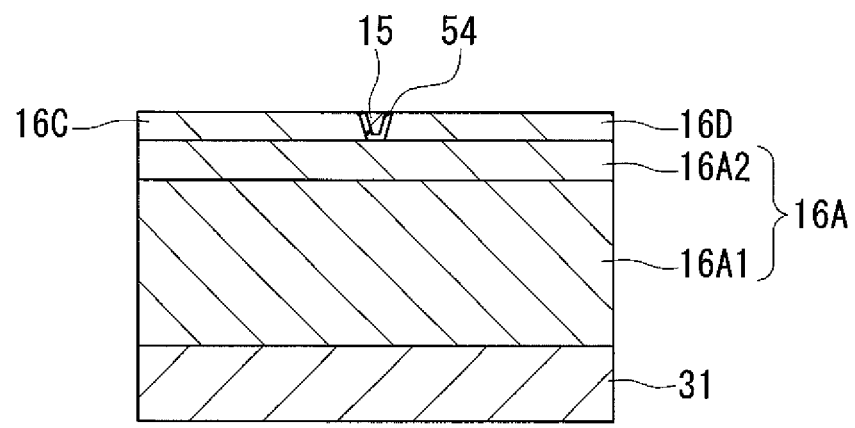

FIG. 21A and FIG. 21B show the next step. In this step, the initial main pole 15P, the first side shield 16C, the second side shield 16D, the initial nonmagnetic metal layer 58P and the nonmagnetic layer 60 are taper-etched in part by, for example, IBE, using the insulating layer 59 as an etching mask. This etching is performed to provide the initial main pole 15P with the inclined portion 15T1. Of the top surface of the initial main pole 15P after the etching, a portion that remains unetched makes the flat portion 15T2. The initial main pole 15P and the initial nonmagnetic metal layer 58P thereby become the main pole 15 and the nonmagnetic metal layer 58, respectively.

Steps to follow the formation of the main pole 15 will now be described with reference to FIG. 2 and FIG. 3. First, the third nonmagnetic layer 61 is formed over the entire top surface of the stack. Then, the fourth nonmagnetic layer 62 is formed on the third nonmagnetic layer 61. The fourth nonmagnetic layer 62 may be formed by a lift-off process, or by first forming a nonmagnetic film on the third nonmagnetic layer 61 and then etching a portion of the nonmagnetic film. The trailing gap section 19 is completed by the formation of the third and fourth nonmagnetic layers 61 and 62. Then, RIE or IBE, for example, is performed to etch portions of the third and fourth nonmagnetic layers 61 and 62 to thereby form two openings for exposing the top surfaces of the first and second side shields 16C and 16D, and etch other portions of the third and fourth nonmagnetic layers 61 and 62 and portions of the nonmagnetic metal layer 58 and the insulating layer 59 to thereby form an opening for exposing the top surface 15T of the main pole 15. Next, the trailing shield 16B is formed on the first and second side shields 16C and 16D and the third and fourth nonmagnetic layers 61 and 62, and the magnetic layer 41 is formed on the main pole 15.

Next, the third and fourth nonmagnetic layers 61 and 62 are selectively etched to form therein an opening for exposing the top surface of the non-illustrated connection layer. The second coil portion 20 is then formed on the fourth nonmagnetic layer 62 and the non-illustrated connection layer by frame plating, for example. Next, the insulating layer 63 is formed over the entire top surface of the stack. The insulating layer 63 is then polished by, for example, CMP, until the trailing shield 16B, the second coil portion 20 and the magnetic layer 41 are exposed.

Next, the insulating layer 64 is formed over the entire top surface of the stack. The insulating layer 64 is then selectively etched to form therein two openings for exposing the respective top surfaces of the trailing shield 16B and the magnetic layer 41. Next, the magnetic layer 42 is formed on the trailing shield 16B, the magnetic layer 41 and the insulating layer 64. The magnetic layer 42 is then etched by, for example, RIE or IBE to provide the magnetic layer 42 with the end face described previously. This etching process also etches a portion of the trailing shield 16B. Next, the nonmagnetic layer 65 is formed over the entire top surface of the stack. The nonmagnetic layer 65 is then polished by, for example, CMP, until the magnetic layer 42 is exposed.

Next, the protective layer 66 is formed to cover the entire top surface of the stack. Then, wiring, terminals and other components are formed on the protective layer 66, and the substrate 1 is cut near the location at which the medium facing surface 80 is to be formed. The cut surface is then polished to form the medium facing surface 80, and processing such as fabrication of flying rails is performed to complete the magnetic head.

In the method of manufacturing the magnetic head according to this embodiment, the second portion 16Ab2 of the top surface 16Ab of the leading shield 16A is formed by etching the initial leading shield 16AP using the mask 81, and thereafter, the first nonmagnetic layer 53 is formed on the second portion 16Ab2. As described previously, the mask 81 has an undercut, and includes the upper section 81B having the wall face 81Ba defining the position of the first front end 53a of the first nonmagnetic layer 53. By forming the second portion 16Ab2 using such a mask 81 and forming the first nonmagnetic layer 53 by a lift-off process, it is possible to easily lift off the mask 81 without any burrs remaining after the formation of the first nonmagnetic layer 53, and it is also possible to precisely define the position of the first front end 53a of the first nonmagnetic layer 53 which has an influence on the write characteristics of the magnetic head.

For the mask 81 of the second example, as previously described, the wall face 81Ba of the upper section 81B can be formed with precision. Thus, the use of the mask 81 of the second example allows more precise definition of the position of the first front end 53a of the first nonmagnetic layer 53.

When employing the mask 81 of the second example, the second layer 81B1 is patterned not by photolithography but by etching with the third layer 81B2 used as a mask. In this case, it is possible to form the initial first layer 81AP by atomic layer deposition at lower temperatures. This allows precise formation of the undercut of the mask 81 and also allows control of the size of the undercut.

The present invention is not limited to the foregoing embodiment, and various modifications may be made thereto. For example, the leading gap section 18A may be formed using three or more nonmagnetic layers including the first and second nonmagnetic layers 53 and 54.

Further, as far as the requirements of the appended claims are met, the shapes and locations of the first and second nonmagnetic layers 53 and 54 and the shape of the main pole 15 may be freely chosen, and need not necessarily be as in the respective examples illustrated in the foregoing embodiment.

Obviously, many modifications and variations of the present invention are possible in the light of the above teachings. Thus, it is to be understood that, within the scope of the appended claims and equivalents thereof, the invention may be practiced in other than the foregoing most preferable embodiment.

What is claimed is:

1. A magnetic head comprising:
   a medium facing surface configured to face a recording medium;
   a coil for producing a magnetic field corresponding to data to be written on the recording medium;
   a main pole configured to pass a magnetic flux corresponding to the magnetic field produced by the coil, and to produce a write magnetic field for use to write the data on the recording medium;
   a write shield formed of a magnetic material; and
   a gap section provided between the main pole and the write shield, and
   including a first nonmagnetic layer and a second nonmagnetic layer each formed of a nonmagnetic material, wherein
   the main pole has: an end face located in the medium facing surface; a top surface located at a front-side end of the main pole in a direction of travel of the recording medium; a bottom end opposite to the top surface; and a first side surface and a second side surface located at opposite ends of the main pole in a track width direction,
   the write shield includes: a leading shield located on a rear side in the direction of travel of the recording medium relative to the main pole; and a trailing shield located on a front side in the direction of travel of the recording medium relative to the main pole,
   the leading shield has a leading shield end face located in the medium facing surface and a top surface opposed to the bottom end of the main pole, the leading shield end face being located on the rear side in the direction of travel of the recording medium relative to the end face of the main pole,
   the trailing shield has a trailing shield end face located in the medium facing surface and a bottom surface opposed to the top surface of the main pole, the trailing shield end face being located on the front side in the direction of travel of the recording medium relative to the end face of the main pole,
   the gap section includes: a leading gap section for separating the leading shield from the bottom end of the main pole; and a trailing gap section for separating the trailing shield from the top surface of the main pole,
   the leading gap section is formed using the first nonmagnetic layer and the second nonmagnetic layer,
   the first nonmagnetic layer has a first front end located closest to but at a distance from the medium facing surface,
   the second nonmagnetic layer has a second front end located in the medium facing surface,
   the top surface of the leading shield includes a first portion and a second portion,
   the first portion has an end located in the medium facing surface,
   the second portion is located farther from the medium facing surface than is the first portion, and recessed from the first portion,
   the first nonmagnetic layer is interposed between the second portion and the second nonmagnetic layer,
   the bottom end of the main pole includes a third portion opposed to the first portion, and a fourth portion opposed to the second portion,
   the second nonmagnetic layer is interposed between the first portion and the third portion, whereas the first nonmagnetic layer is not interposed therebetween,
   the first and second nonmagnetic layers are interposed between the second portion and the fourth portion, and
   the second portion and the fourth portion are substantially parallel to each other.

2. The magnetic head according to claim 1, wherein there is no difference in level between the third portion and the fourth portion.

3. The magnetic head according to claim 1, wherein
   the top surface of the leading shield has a first end located in the medium facing surface and a second end opposite to the first end, and
   the top surface of the leading shield is inclined with respect to the medium facing surface and a direction perpendicular to the medium facing surface such that the second end is located on the rear side in the direction of travel of the recording medium relative to the first end.

4. The magnetic head according to claim 1, wherein
   the write shield further includes a first side shield and a second side shield located on opposite sides of the main pole in the track width direction,
   the first side shield and the second side shield respectively have a first side shield end face and a second side shield end face located in the medium facing surface at positions on opposite sides of the end face of the main pole in the track width direction, and
   the gap section further includes a first side gap section and a second side gap section for separating the first side shield and the second side shield from the first side surface and the second side surface of the main pole, respectively.

5. The magnetic head according to claim 1, further comprising a return path section formed of a magnetic material and connecting the write shield to a part of the main pole located away from the medium facing surface.

6. A method of manufacturing the magnetic head of claim 1, comprising the steps of:
   forming the leading shield;
   forming the leading gap section after the leading shield is formed;
   forming the main pole after the leading gap section is formed;

forming the trailing gap section after the main pole is formed;

forming the trailing shield after the trailing gap section is formed; and forming the coil, wherein the step of forming the leading shield includes the steps of:

forming an initial leading shield having a top surface, the top surface including a first region to become the first portion and a second region to be etched later to form the second portion;

forming a mask having an undercut and covering the first region of the top surface of the initial leading shield; and etching the second region of the top surface of the initial leading shield by using the mask so that the first region becomes the first portion and the second portion is formed by the etching of the second region to thereby make the initial leading shield into the leading shield, and the step of forming the leading gap section includes the steps of:

forming the first nonmagnetic layer on the second portion in the presence of the mask;

removing the mask after the first nonmagnetic layer is formed; and forming the second nonmagnetic layer on the first portion and the first nonmagnetic layer.

7. The method of manufacturing the magnetic head according to claim 6, wherein the mask includes a first layer, and a second layer stacked on the first layer, and the step of forming the mask includes the steps of:

forming an initial first layer on the top surface of the initial leading shield;

forming an initial second layer on the initial first layer;

patterning the initial second layer into the second layer by photolithography; and etching the initial first layer by wet etching after the patterning of the initial second layer so that the initial first layer becomes the first layer and the mask is thereby completed.

8. The method of manufacturing the magnetic head according to claim 6, wherein the mask includes a first layer, and a second and a third layer stacked in this order on the first layer, and the step of forming the mask includes the steps of:

forming an initial first layer on the top surface of the initial leading shield;

forming an initial second layer on the initial first layer;

forming the third layer on the initial second layer;

etching the initial second layer into the second layer by using the third layer as an etching mask; and etching the initial first layer by wet etching after the etching of the initial second layer so that the initial first layer becomes the first layer and the mask is thereby completed.

\* \* \* \* \*